United States Patent
Engerman

(10) Patent No.: US 10,995,835 B2
(45) Date of Patent: May 4, 2021

(54) MULTI-SPEED GEARBOX WITH HIGH TORQUE RATIO AND THE DRIVE AXLE MADE THEREWITH

(71) Applicant: Dana Automotive Systems Group, LLC, Maumee, OH (US)

(72) Inventor: Eric M. Engerman, Northville, MI (US)

(73) Assignee: Dana Automotive Systems Group, LLC, Maumee, OH (US)

(*) Notice: Subject to any disclaimer, the term of this patent is extended or adjusted under 35 U.S.C. 154(b) by 0 days.

(21) Appl. No.: 16/443,099

(22) Filed: Jun. 17, 2019

(65) Prior Publication Data
US 2019/0383373 A1 Dec. 19, 2019

Related U.S. Application Data

(60) Provisional application No. 62/685,766, filed on Jun. 15, 2018.

(51) Int. Cl.
| | |
|---|---|
| *B60K 1/00* | (2006.01) |
| *F16H 37/08* | (2006.01) |
| *B60K 17/08* | (2006.01) |
| *B60K 17/16* | (2006.01) |
| *F16H 3/54* | (2006.01) |
| *F16H 3/66* | (2006.01) |

(52) U.S. Cl.
CPC .............. *F16H 37/082* (2013.01); *B60K 1/00* (2013.01); *B60K 17/08* (2013.01); *B60K 17/16* (2013.01); *F16H 3/54* (2013.01); *F16H 3/66* (2013.01); *B60K 2001/001* (2013.01); *F16H 2200/0034* (2013.01); *F16H 2200/0039* (2013.01); *F16H 2200/201* (2013.01); *F16H 2200/2005* (2013.01); *F16H 2200/2007* (2013.01); *F16H 2200/2012* (2013.01); *F16H 2200/2035* (2013.01); *F16H 2200/2038* (2013.01)

(58) Field of Classification Search
CPC . F16H 37/082; F16H 3/54; F16H 3/66; F16H 2200/0034; F16H 2200/0039; F16H 2200/2005; F16H 2200/2007; F16H 2200/2012; F16H 2200/2035; F16H 2200/2038; B60K 1/00; B60K 17/08; B60K 17/16; B60K 2001/001; B60K 17/12; B60K 17/02; B60K 17/354; B60Y 2400/428
See application file for complete search history.

(56) References Cited

U.S. PATENT DOCUMENTS

| | | | |
|---|---|---|---|
| 8,827,859 B2 * | 9/2014 | Fox ..................... | F16H 48/08 475/231 |
| 8,870,698 B2 * | 10/2014 | Mack ................... | B60L 50/16 475/150 |
| 9,156,348 B1 * | 10/2015 | Swales ................ | B60K 17/046 |

(Continued)

*Primary Examiner* — David J Hlavka
(74) *Attorney, Agent, or Firm* — McCoy Russell LLP

(57) ABSTRACT

An electric drive axle assembly of a vehicle includes an electric motor having an output shaft. At least one of a gear and a planetary gear assembly is coupled to the output shaft of the electric motor. The at least one of the gear and the planetary gear assembly is coupled to a differential mechanism configured to transfer torque to two axle shafts of the vehicle. The electric drive axle assembly configured to produce a plurality of speed ratios between the electric motor and the differential mechanism.

19 Claims, 8 Drawing Sheets

(56) References Cited

U.S. PATENT DOCUMENTS

| | | | | |
|---|---|---|---|---|
| 2011/0312460 | A1* | 12/2011 | Nett | B60W 10/10 475/5 |
| 2013/0267368 | A1* | 10/2013 | Petersen | F16H 48/08 475/150 |
| 2014/0141921 | A1* | 5/2014 | Fox | F16H 37/082 475/231 |
| 2014/0274528 | A1* | 9/2014 | Valente | G01N 30/74 475/150 |

* cited by examiner

MULTI-SPEED GEARBOX WITH HIGH TORQUE RATIO AND THE DRIVE AXLE MADE THEREWITH

RELATED APPLICATIONS

The present application claims the benefit of U.S. Provisional Patent Application No. 62/685,766 filed on Jun. 15, 2018, which is fully incorporated by reference herein.

FIELD

The presently disclosed subject matter relates to an axle assembly, and more particularly to a multi-speed gearbox with high torque ratio for an axle assembly.

BACKGROUND

The present disclosure relates to gearboxes and electric drive axles. Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

However, in order for the conventional electric vehicle to achieve sufficient speed, the electric motor must allow for reasonable power over a broad speed range. An electric motor which can provide reasonable power over a broad speed range is typically large and heavy.

In view of the above, it would be desirable to produce an axle assembly capable of operating at high torque and low speed while having reduced size, weight, and production costs.

SUMMARY

In concordance and agreement with the present disclosure, an axle assembly capable of operating at high torque and low speed while having reduced size, weight, and production costs, has surprisingly been discovered.

In one embodiment, an axle assembly, comprises: an electric motor having an output shaft; at least one of a gear and a first planetary gear assembly coupled to the output shaft; a differential mechanism connected with the at least one of the gear and the first planetary gear assembly, wherein the differential mechanism is coupled to at least one axle shaft; a first clutch assembly drivingly connected with at least one of the output shaft and the differential mechanism, wherein an engagement of the first clutch assembly produces a first speed ratio; and a second clutch assembly drivingly connected with at least one of the output shaft and the differential mechanism, wherein an engagement of the second clutch assembly produces a second speed ratio.

As aspects of certain embodiments, the axle assembly further comprises a third clutch assembly drivingly connected with at least one of the output shaft and the differential mechanism, wherein an engagement of the third clutch assembly produces a third speed ratio.

As aspects of certain embodiments, the axle assembly further comprises a compound idler assembly connected to at least one of the output shaft and the differential mechanism.

As aspects of certain embodiments, the compound idler assembly is disposed offset and parallel to the output shaft of the electric motor.

As aspects of certain embodiments, at least one of the first planetary gear assembly, the first clutch assembly, and the second clutch assembly is disposed on the compound idler assembly.

As aspects of certain embodiments, one of the first clutch assembly, the second clutch assembly, and the third clutch assembly is coupled to the first planetary gear assembly.

As aspects of certain embodiments, the at least one axle shaft is coaxially aligned with the output shaft.

As aspects of certain embodiments, the first planetary gear assembly is selectively coupled to the output shaft by one of the first clutch assembly and the second clutch assembly.

As aspects of certain embodiments, the axle assembly further comprises a second planetary gear assembly coupled to the output shaft.

As aspects of certain embodiments, the second planetary gear assembly is selectively coupled to the output shaft by one of the first clutch assembly and the second clutch assembly.

As aspects of certain embodiments, the second planetary gear assembly is coupled to the first planetary gear assembly.

As aspects of certain embodiments, the axle assembly further comprises a third planetary gear assembly coupled to the at least one axle shaft.

As aspects of certain embodiments, the axle assembly further comprises a fourth planetary gear assembly coupled to the at least one axle shaft.

In another embodiment, a method for an axle assembly, comprises: providing an axle assembly including: an electric motor having an output shaft; at least one of a gear and a first planetary gear assembly coupled to the output shaft; a differential mechanism connected with the at least one of the gear and the first planetary gear assembly, wherein the differential mechanism is coupled to at least one axle shaft; a first clutch assembly drivingly connected with at least one of the output shaft and the differential mechanism, wherein an engagement of the first clutch assembly produces a first speed ratio; and a second clutch assembly drivingly connected with at least one of the output shaft and the differential mechanism, wherein an engagement of the second clutch assembly produces a second speed ratio; and causing the engagement of one of the first clutch assembly and the second clutch assembly.

As aspects of certain embodiments, the engagement of the first clutch assembly produces a first speed ratio and engagement of the second clutch assembly produces a second speed ratio.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
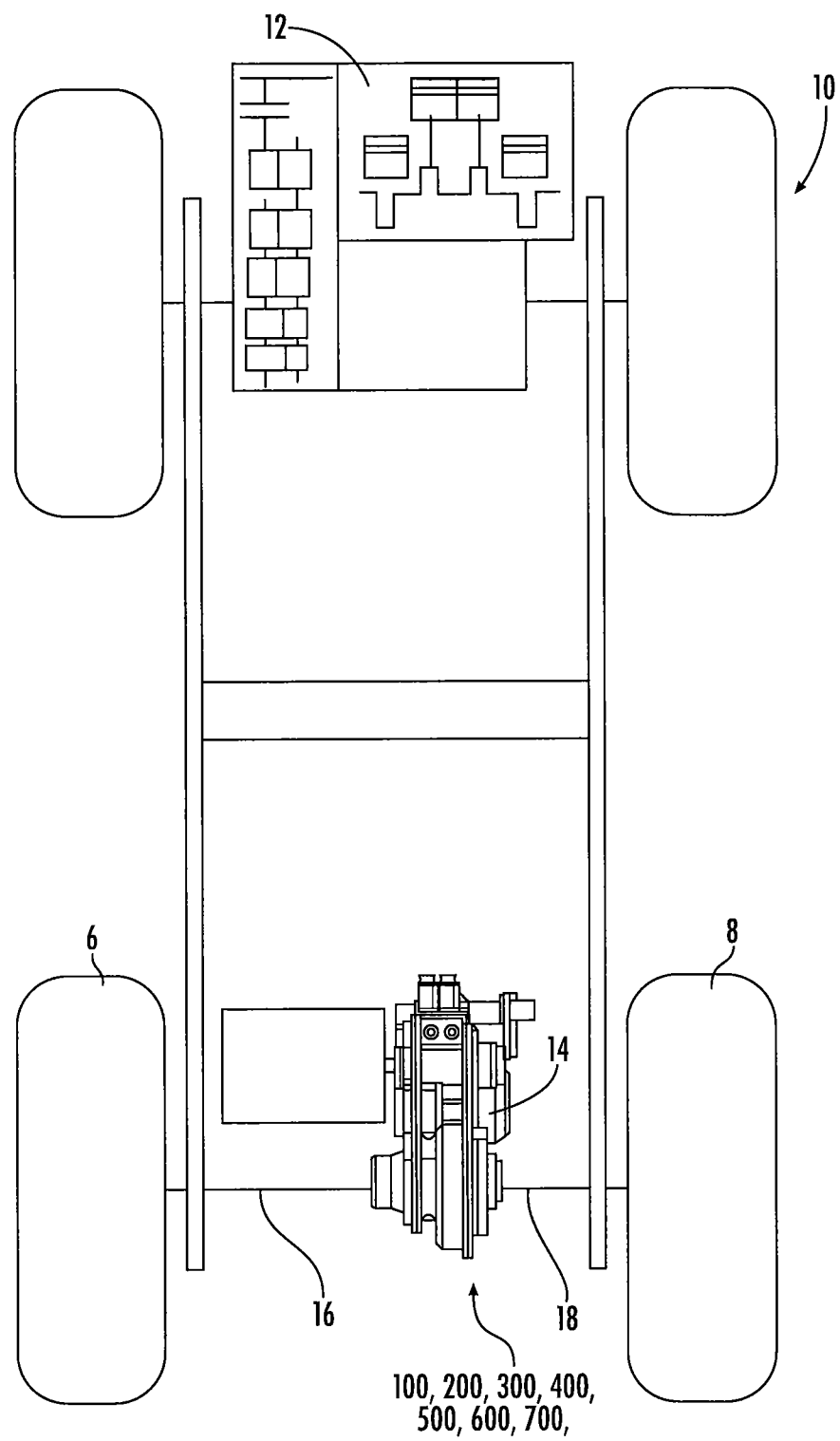
FIG. 1 is a schematic diagram of a vehicle driveline according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle assembly 100, 200, 300, 400, 500, 600, 700 are described below. In certain embodiments, one of the electric drive axle assemblies 100, 200, 300, 400, 500, 600, 700 is utilized with a pure electric vehicle (not depicted) where the one of the electric drive axle assemblies 100, 200, 300, 400, 500, 600, 700 is the only driving axle. In other embodiments, as illustrated in FIG. 1, the one of the electric drive axle assemblies 100, 200, 300, 400, 500, 600, 700 is utilized with a hybrid all-wheel-drive vehicle 10, where the front axle is driven by an internal combustion engine 12, and the rear axle is the one of the electric drive axle assemblies 100, 200, 300, 400, 500, 600, 700. In still other embodiments, the one of the electric drive axle assemblies 100, 200, 300, 400, 500, 600, 700 is utilized in a hybrid commercial vehicle (not depicted) comprising a tandem axle in which the front tandem axle is driven by an internal combustion engine, and the rear tandem axle is the one of the electric drive axle assemblies 100, 200, 300, 400, 500, 600, 700 (or vice versa). The electric drive axle assemblies 100, 200, 300, 400, 500, 600, 700 may have applications in commercial vehicles, both light duty and heavy-duty vehicles, and for passenger, off-highway, and sport utility vehicles. Additionally, the electric drive axle assemblies 100, 200, 300, 400, 500, 600, 700 described herein may be adapted for use in front and/or rear driving axles, and in steerable and non-steerable axles. It would be understood by one of ordinary skill in the art that the electric drive axle assemblies 100, 200, 300, 400, 500, 600, 700 also have industrial, locomotive, military, agricultural, and aerospace applications.

As illustrated in FIGS. 2-9, each of the electric drive axle assemblies 100, 200, 300, 400, 500, 600, 700 may include an integrated drive system. The electric drive axle assemblies 100, 200, 300, 400, 500, 600, 700 each may include a respective electric motor 104, 204, 304, 404, 504, 604, 704 coupled with a power source (not depicted). The electric motors 104, 204, 304, 404, 504, 604, 704 may be a permanent magnet synchronous machine comprising a stator (not depicted) disposed concentrically about a rotor (not depicted). The electric drive axle assemblies 100, 200, 300, 400, 500, 600, 700 may additionally comprise an inverter (not depicted) for converting direct current to alternating current when the electric motors 104, 204, 304, 404, 504, 604, 704 are utilized to drive the vehicle, and for converting alternating current to direct current when the vehicle 10 decelerates. Each of the electric motors 104, 204, 304, 404, 504, 604, 704 may be referred to herein as a motor-generator. Further, the electric drive axle assemblies 100, 200, 300, 400, 500, 600, 700 may include cooling fluid (not depicted) such as, but not limited to, automatic transmission fluid or axle oil integrated with the lubricant of the electric drive axle assemblies 100, 200, 300, 400, 500, 600, 700 for cooling the electric motors 104, 204, 304, 404, 504, 604, 704 and the inverter. In another embodiment (not depicted), the cooling fluid for the electric motors 104, 204, 304, 404, 504, 604, 704 and the inverter may not be integrated with the axle oil.

Figure 2:
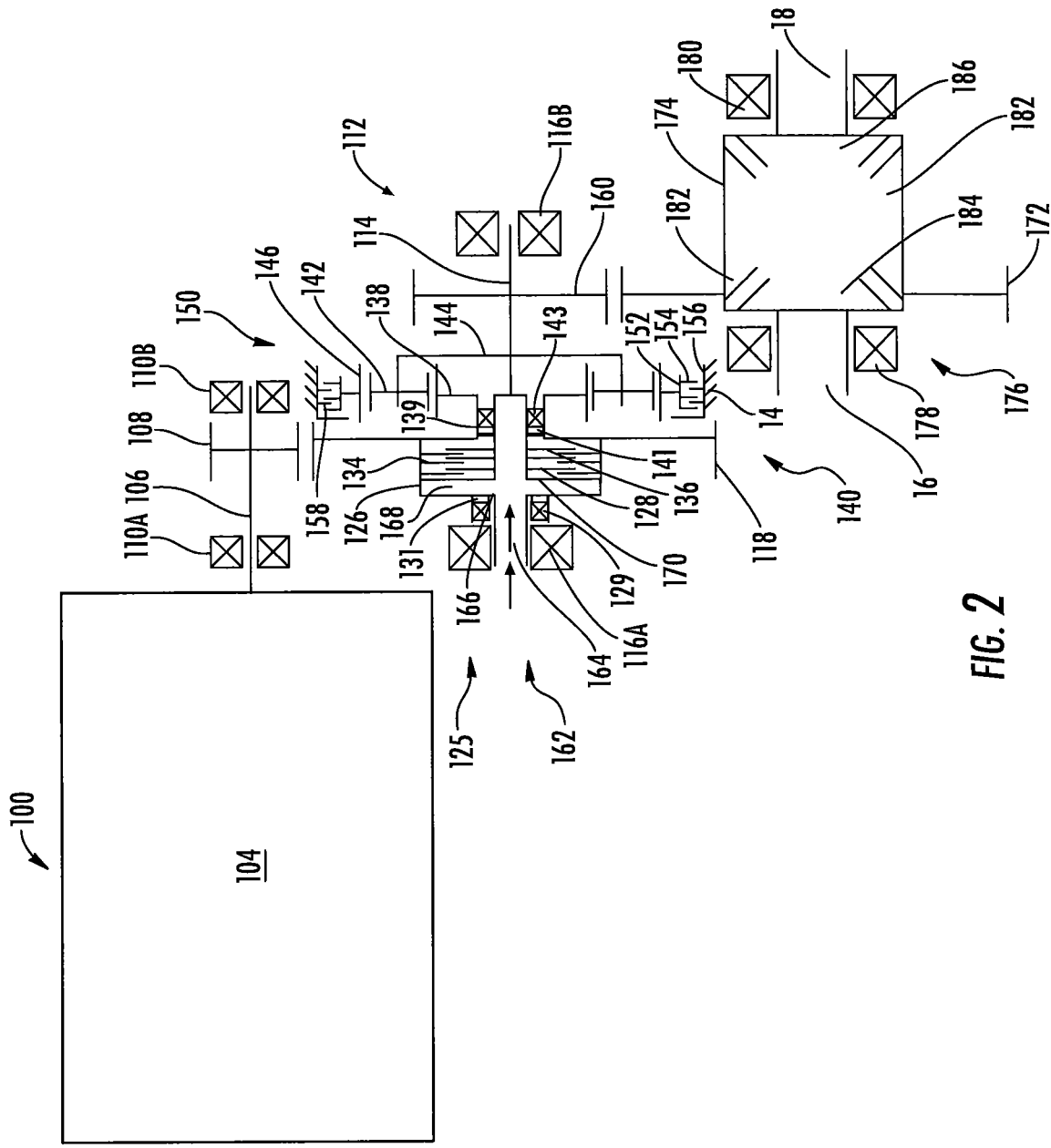
FIG. 2 is a schematic diagram of an electric axle assembly according to an embodiment of the presently disclosed subject matter.

In the embodiment shown in FIG. 2, an output shaft 106 is coupled with the rotor of the electric motor 104 for rotation therewith. A first gear 108 is coupled with the output shaft 106 for rotation therewith. The output shaft 106 may be rotatably supported via first and second roller bearings 110A, 110B. In an embodiment, the first gear 108 is forged on the output shaft 106. In another embodiment, the first gear 108 may be welded to the output shaft 106. In still another embodiment, the first gear 108 may be splined to the output shaft 106. The electric motor 104 drives a compound idler assembly 112 via the output shaft 106 and the first gear 108.

As illustrated, the output shaft 106, the compound idler assembly 112, and axle shafts 16, 18 of the electric drive axle assembly 100 are disposed offset and parallel relative to one another. In an embodiment, the compound idler assembly 112 comprises an idler shaft 114. It should be appreciated that the idler shaft 114 may be rotatably supported in an axle housing 14, shown in FIG. 1, via third and fourth roller bearings 116A, 116B. A second gear 118 is disposed concentrically about at least a portion of the idler shaft 114. The second gear 118 is in meshed engagement with the first gear 108 and receives torque therefrom when the electric motor 104 outputs torque to the output shaft 106. In an embodiment, the second gear 118 has a generally cylindrical shape. The second gear 118 is part of a first clutch assembly 125.

In an embodiment, the first clutch assembly 125 comprises a first clutch drum 126 disposed at least partially concentrically within the second gear 118. A radially outer surface of the first clutch drum 126 is coupled with a radially inner surface of the second gear 118. In an embodiment, the first clutch drum 126 and the second gear 118 may be coupled via splined engagement. In another embodiment, the first clutch drum 126 and the second gear 118 may be coupled via an interference fit. In yet another embodiment, the second gear 118 and the first clutch drum 126 may comprise a unitary component. The first clutch drum 126 may be rotatably supported on the idler shaft 114 via a fifth roller bearing 129. A first rotary sealing member 131 is disposed adjacent to the fifth roller bearing 129 to create a substantially fluid-tight seal between a portion of the first clutch drum 126 and a portion of the idler shaft 114.

A first clutch hub 128 is disposed at least partially concentrically within the first clutch drum 126. In an embodiment, the first clutch hub 128 may be coupled for rotation with the idler shaft 114. In another embodiment, the first clutch hub 128 may comprise a splined radially inner surface in meshed engagement with complimentary splines on the idler shaft 114. The second gear 118 is entirely supported on the idler shaft 114 by the first clutch hub 128 via the first clutch drum 126. In another embodiment, the first clutch hub 128 may be formed unitary and integral with the idler shaft 114.

A first plurality of clutch plates 134 are coupled for rotation with the first clutch drum 126. The clutch plates 134 receive torque from the first clutch drum 126 and may move axially within the first clutch drum 126. A second plurality of clutch plates 136 are in meshed engagement with the first clutch hub 128. The second plurality of clutch plates 136 are interleaved with the first plurality of clutch plates 134. The second plurality of clutch plates 136 may move axially along the first clutch hub 128. The first clutch assembly 125 may be nested within the second gear 118.

A third gear 138 is disposed concentrically about the idler shaft 114. The third gear 138 is coupled with the second gear 118 for rotation therewith. In an embodiment, the third gear 138 may be coupled with the second gear 118 via a hollow cylindrical shaft 139. A second rotary sealing member 141 may be disposed radially between the hollow cylindrical shaft 139 and the idler shaft 114. A sixth roller bearing 143 may be disposed axially adjacent to the second rotary sealing member 141 to at least partially rotatably support the third and fourth gears 118, 138 on the idler shaft 114. In certain embodiments, the second rotary sealing member 141 is disposed adjacent to the sixth roller bearing 143 to create a substantially fluid-tight seal between a portion of the first clutch drum 126 and a portion of the idler shaft 114.

In an embodiment, as illustrated in FIG. 2, the third gear 138 may be a sun gear of a planetary gear assembly 140. The planetary gear assembly 140 may further comprise two or more planet gears 142 in meshed engagement with the third gear 138. The planet gears 142 may be rotatably disposed on planet pins (not depicted) coupled with a planet carrier 144. The planet carrier 144 may be coupled with the idler shaft 114 for rotation therewith. The planet gears 142 may also be in meshed engagement with a ring gear 146 disposed at least partially concentrically about the planet gears 142 and the third gear 138. The ring gear 146 may be selectively engaged with a stationary structure such as the axle housing 14, for example, via a second clutch assembly 150.

The second clutch assembly 150 may comprise a second clutch hub 152 coupled with the ring gear 146. The second clutch hub 152 may include a plurality of axially extending splines on a radially outer surface thereof. A first plurality of clutch plates 154 are in meshed engagement with the second clutch hub 152. The first plurality of clutch plates 154 may move axially along the second clutch hub 152. The stationary structure may comprise a second clutch drum 156 having a plurality of axially extending splines on a radially inner surface thereof. A second plurality of clutch plates 158 are in meshed engagement with the second clutch drum 156. The second plurality of clutch plates 158 may move axially within the second clutch drum 156 and are interleaved with the first plurality of clutch plates 154.

A fourth gear 160 is disposed concentrically about the idler shaft 114 axially between the planet carrier 144 and the fourth roller bearing 116B. The fourth gear 160 may be coupled for rotation with the idler shaft 114. A first actuator assembly 162 may be utilized to selectively actuate the first clutch assembly 125. In an embodiment, as illustrated in FIG. 2, the first actuator assembly 162 may comprise a hydraulic actuator. In an embodiment, the first actuator assembly 162 comprises a hollow portion 164 of the idler shaft 114. The idler shaft hollow portion 164 may comprise one more radially extending apertures 166 in fluid communication with a chamber 168. The chamber 168 may be defined by the idler shaft 114, a portion of the first clutch drum 126, the rotary sealing member 131, and a pressure plate 170. The first actuator assembly 162 may comprise a fluid reservoir (not depicted) in fluid communication with the hollow portion 164 of the idler shaft 114. The hollow portion 164 of the idler shaft 114 is in fluid communication with the chamber 168 of the first actuator assembly 162 via the one or more apertures 166. When the fluid pressure in the chamber 168 is increased via a pump (not depicted), the pressure plate 170 is axially actuated to frictionally engage the first and second pluralities of clutch plates 134, 136 of the first clutch assembly 125.

The fourth gear 160 is in meshed engagement with a fifth gear 172. The fifth gear 172 is coupled with, and fixed for rotation with, a differential case 174. The differential case 174 is part of a differential mechanism 176. The differential case 174 may be rotatably supported within the axle housing 14 via seventh and eighth roller bearings 178, 180. The differential mechanism 176 further includes two or more differential pinions 182. The differential pinions 182 are coupled within the differential case 174 via a pinion shaft (i.e., spider shaft) (not depicted). In an embodiment, the pinion shaft may comprise a cross member. The differential pinions 182 are in meshed engagement with a first side gear 184 and a second side gear 186. The first side gear 184 is coupled for rotation with the first axle shaft 16, and the second side gear 186 is coupled for rotation with the second axle shaft 18. A second actuator assembly (not depicted) may be utilized to actuate and selectively engage the second clutch assembly 150. The second actuator assembly may comprise, but is not limited to, a hydraulic actuator, an electromagnetic actuator, a cam actuator, or a ball and ramp actuator.

The high speed of electric motors presents obstacles to their use with conventional transmission gearbox designs. To prevent operating bearings disposed between a rotating clutch assembly and an actuator assembly at the high speeds produced by an electric motor, the compound idler assembly 112 locates the first and second clutch assemblies 125, 150 after a first gear reduction comprising the first gear 108 and the second gear 118.

In operation, when a first speed ratio is desired, the first actuator assembly 162 causes the first clutch assembly 125 to engage, while the second clutch assembly 150 remains disengaged. When the first clutch assembly 125 is engaged, the output shaft 106 of the electric motor 104 causes the output shaft 106 and the first gear 108 coupled thereto, to rotate therewith. Torque is transferred from the electric motor 104 to the first gear 108. A rotation of the first gear 108 drives the second gear 118 of the compound idler assembly 112. Hence, the torque is then transferred from the first gear 108 to the second gear 118. Since the first clutch assembly 125 is engaged, the rotation of the second gear 118 causes the idler shaft 114 and the fourth gear 160 coupled thereto, to rotate therewith. The torque from the second gear 118 is then transferred to the idler shaft 114 via the first clutch assembly 125, and from the idler shaft 114 to the fourth gear 160. The torque transferred from the second gear 118 to the fourth gear 160 remains unchanged because the planetary gear assembly 140 freely rotates due to the second clutch assembly 150 being disengaged.

A rotation of the fourth gear 160 drives the fifth gear 172 of the differential mechanism 176, and causes the differential case 174 to rotate therewith. As such, the torque from the fourth gear 160 is transferred through the fifth gear 172 to the differential mechanism 176. A rotation of the differential case 174 further causes the first and second axle shafts 16, 18 to rotate therewith. The rotation of the differential mechanism 176 transfers a desired first torque from the differential mechanism 176 to the first and second axle shafts 16, 18. When the electric drive axle 100 is in a power generation mode, the torque transfer described above is reversed.

In certain embodiments, the first speed ratio may also be referred to as a highway ratio. The first speed ratio enables the electric drive axle assembly 100 to operate at low torque and high speed.

When a second speed ratio is desired, the first clutch assembly 125 is disengaged, while the second actuator assembly causes the second clutch assembly 150 to engage. When the second clutch assembly 150 is engaged, the output shaft 106 of the electric motor 104 causes the output shaft 106 and the first gear 108 coupled thereto, to rotate therewith. Torque is transferred from the electric motor 104 to the first gear 108. A rotation of the first gear 108 drives the second gear 118 of the compound idler assembly 112. Hence, the torque is transferred from the first gear 108 to the second gear 118. Since the second gear 118 and the third gear 138 are disposed on the cylindrical shaft 139 and the second clutch assembly 150 is engaged, a rotation of the second gear 118 causes the cylindrical shaft 139 and the third gear 138 coupled thereto, to rotate therewith. The torque is then transferred from the first gear 108 to the third gear 138 via the second gear 118. Since the second clutch assembly 150 is engaged, a rotation of the third gear 138 drives the planet gears 142 and the planet carrier 144 coupled thereto. As such, the torque from the third gear 138 is then transferred to the planet carrier 144 via the planet gears 142. A rotation of the planet carrier 144 causes the idler shaft 114 and the fourth gear 160 coupled thereto, to rotate therewith. The torque from the planet carrier 144 is then transferred to the idler shaft 114 to the fourth gear 160. The torque transferred from the second gear 118 to the fourth gear 160 is increased because of the planetary gear assembly 140.

A rotation of the fourth gear 160 drives the fifth gear 172 of the differential mechanism 176, and causes the differential case 174 to rotate therewith. As such, the torque from the fourth gear 160 is transferred through the fifth gear 172 to the differential mechanism 176. A rotation of the differential case 174 further causes the first and second axle shafts 16, 18 to rotate therewith. The rotation of the differential mechanism 176 transfers a desired second torque from the differential mechanism 176 to the first and second axle shafts 16, 18. When the electric drive axle 100 is in a power generation mode, the torque transfer described above is reversed.

In certain embodiments, the second speed ratio may also be referred to as a crawl ratio. The second speed ratio enables the electric drive axle assembly 100 to operate at high torque and low speed.

Accordingly, the compound idler assembly 112 enables the electric drive axle assembly 100 to achieve a drive ratio span facilitating urban, rural, and highway driving as well as towing and rock crawling.

Figure 3:
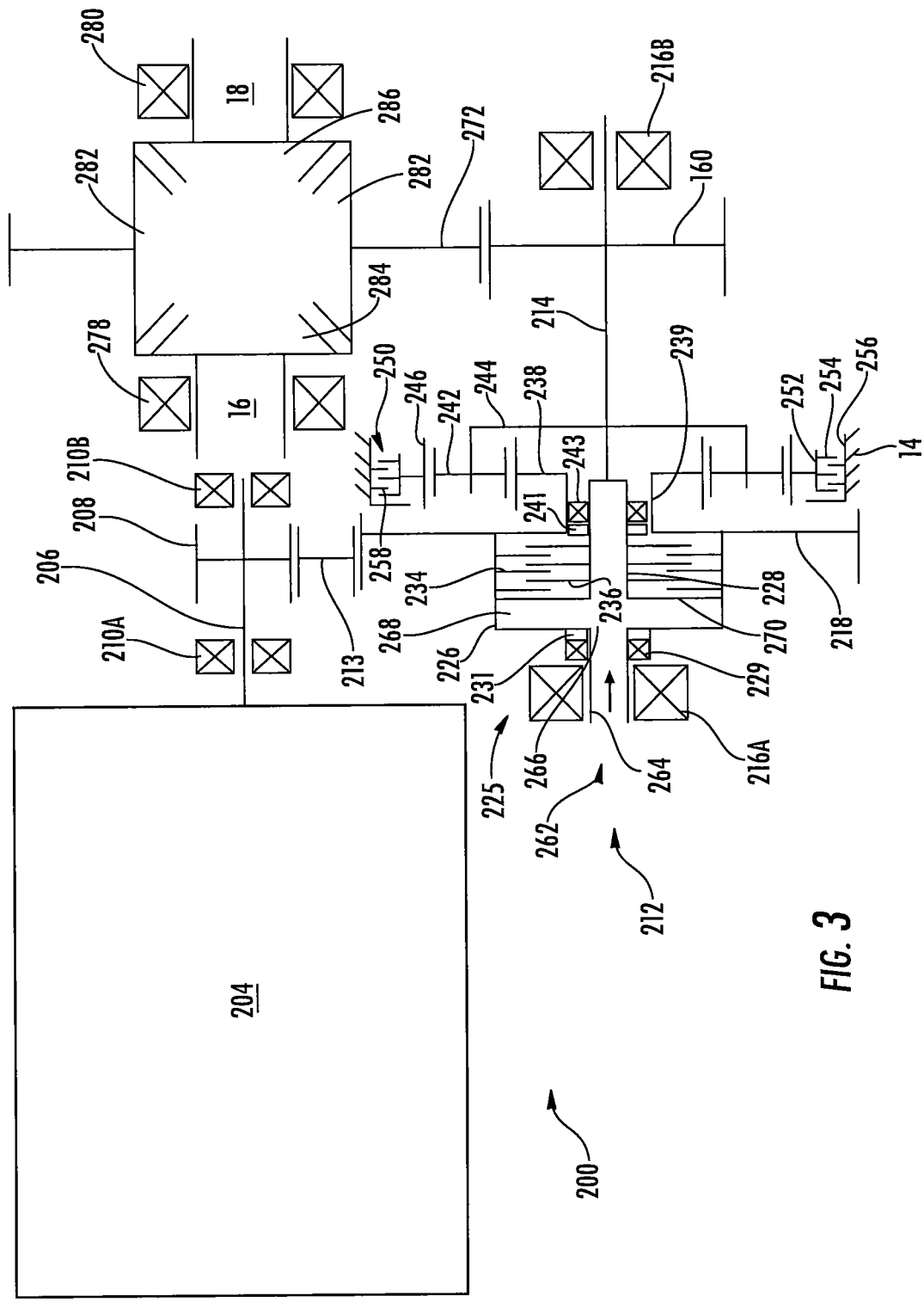
FIG. 3 is a schematic diagram of an electric axle assembly according to another embodiment of the presently disclosed subject matter.

As illustrated in FIG. 3, in an embodiment, the electric drive axle assembly 200 includes an output shaft 206. The output shaft 206 is coupled with the rotor of the electric motor 204 for rotation therewith. A first gear 208 is coupled with the output shaft 206 for rotation therewith. The output shaft 206 may be rotatably supported via first and second roller bearings 210A, 210B. In an embodiment, the first gear 208 is forged on the output shaft 206. In another embodiment, the first gear 208 may be welded to the output shaft 206. In still another embodiment, the first gear 208 may be splined to the output shaft 206. The electric motor 204 drives a compound idler assembly 212 via the output shaft 206 and the first gear 208.

As illustrated, the output shaft 206 is disposed coaxially with the axle shafts 16, 18, and the compound idler assembly 212 is disposed offset and parallel to the output shaft 206. In an embodiment, the compound idler assembly 212 comprises an idler shaft 214. It should be appreciated that the idler shaft 214 may be rotatably supported in the axle housing 14, shown in FIG. 1, via third and fourth roller bearings 216A, 216B. The second gear 218 is disposed concentrically about at least a portion of the idler shaft 214. In an embodiment, the second gear 218 has a generally cylindrical shape. The second gear 218 is part of a first clutch assembly 225.

In an embodiment, the first clutch assembly 225 comprises a first clutch drum 226 disposed at least partially concentrically within the second gear 218. A radially outer surface of the first clutch drum 226 is coupled with a radially inner surface of the second gear 218. In an embodiment, the first clutch drum 226 and the second gear 218 may be coupled via splined engagement. In another embodiment, the first clutch drum 226 and the second gear 218 may be coupled via an interference fit. In yet another embodiment, the second gear 218 and the first clutch drum 226 may comprise a unitary component. The first clutch drum 226 may be rotatably supported on the idler shaft 214 via a fifth roller bearing 229. A first rotary sealing member 231 is disposed adjacent to the fifth roller bearing 229 to create a substantially fluid-tight seal between a portion of the first clutch drum 226 and a portion of the idler shaft 214.

A first clutch hub 228 is disposed at least partially concentrically within the first clutch drum 226. In an embodiment, the first clutch hub 228 may be coupled for rotation with the idler shaft 214. In another embodiment, the first clutch hub 228 may comprise a splined radially inner surface in meshed engagement with complimentary splines on the idler shaft 214. The second gear 218 is entirely supported on the idler shaft 214 by the first clutch hub 228 via the first clutch drum 226. In another embodiment, the first clutch hub 228 may be formed unitary and integral with the idler shaft 214.

A first plurality of clutch plates 234 are coupled for rotation with the first clutch drum 226. The clutch plates 234 receive torque from the first clutch drum 226 and may move axially within the first clutch drum 226. A second plurality of clutch plates 236 are in meshed engagement with the first clutch hub 228. The second plurality of clutch plates 236 are interleaved with the first plurality of clutch plates 234. The second plurality of clutch plates 236 may move axially along the first clutch hub 228. The first clutch assembly 225 may be nested within the second gear 218.

A third gear 238 is disposed concentrically about the idler shaft 214. The third gear 238 is coupled with the second gear 218 for rotation therewith. In an embodiment, the third gear 238 may be coupled with the second gear 218 via a hollow cylindrical shaft 239. A second rotary sealing member 241 may be disposed radially between the hollow cylindrical shaft 239 and the idler shaft 214. A sixth roller bearing 243 may be disposed axially adjacent to the second rotary sealing member 241 to at least partially rotatably support the third and fourth gears 218, 238 on the idler shaft 214. In certain embodiments, the second rotary sealing member 241 is disposed adjacent to the sixth roller bearing 243 to create a substantially fluid-tight seal between a portion of the first clutch drum 226 and a portion of the idler shaft 214.

In an embodiment, as illustrated in FIG. 3, the third gear 238 may be a sun gear of a planetary gear assembly 240. The planetary gear assembly 240 may further comprise two or more planet gears 242 in meshed engagement with the third gear 238. The planet gears 242 may be rotatably disposed on planet pins (not depicted) coupled with a planet carrier 244. The planet carrier 244 may be coupled with the idler shaft 214 for rotation therewith. The planet gears 242 may also be in meshed engagement with a ring gear 246 disposed at least partially concentrically about the planet gears 242 and the third gear 238. The ring gear 246 may be selectively engaged with a stationary structure such as the axle housing 14, for example, via a second clutch assembly 250.

The second clutch assembly 250 may comprise a second clutch hub 252 coupled with the ring gear 246. The second clutch hub 252 may include a plurality of axially extending splines on a radially outer surface thereof. A first plurality of clutch plates 254 are in meshed engagement with the second clutch hub 252. The first plurality of clutch plates 254 may move axially along the second clutch hub 252. The stationary structure may comprise a second clutch drum 256 having a plurality of axially extending splines on a radially inner surface thereof. A second plurality of clutch plates 258 are in meshed engagement with the second clutch drum 256. The second plurality of clutch plates 258 may move axially within the second clutch drum 256 and are interleaved with the first plurality of clutch plates 254.

A fourth gear 260 is disposed concentrically about the idler shaft 214 axially between the planet carrier 244 and the fourth roller bearing 216B. The fourth gear 260 may be coupled for rotation with the idler shaft 214. A first actuator assembly 262 may be utilized to selectively actuate the first clutch assembly 225. In an embodiment, as illustrated in FIG. 3, the first actuator assembly 262 may comprise a hydraulic actuator. In an embodiment, the first actuator assembly 262 comprises a hollow portion 264 of the idler shaft 214. The idler shaft hollow portion 264 may comprise one more radially extending apertures 266 in fluid communication with a chamber 268. The chamber 268 may be defined by the idler shaft 214, a portion of the first clutch drum 226, the rotary sealing member 231, and a pressure plate 270. The first actuator assembly 262 may comprise a fluid reservoir (not depicted) in fluid communication with the hollow portion 264 of the idler shaft 214. The hollow portion 264 of the idler shaft 214 is in fluid communication with the chamber 268 of the first actuator assembly 262 via the one or more apertures 266. When the fluid pressure in the chamber 268 is increased via a pump (not depicted), the pressure plate 270 is axially actuated to frictionally engage the first and second pluralities of clutch plates 234, 236 of the first clutch assembly 225.

The fourth gear 260 is in meshed engagement with a fifth gear 272. The fifth gear 272 is coupled with, and fixed for rotation with, a differential case 274. The differential case 274 is part of a differential mechanism 276. The differential case 274 may be rotatably supported within the axle housing 14 via seventh and eighth roller bearings 278, 280. The differential mechanism 276 further includes two or more differential pinions 282. The differential pinions 282 are coupled within the differential case 274 via a pinion shaft (i.e., spider shaft) (not depicted). In an embodiment, the pinion shaft may comprise a cross member. The differential pinions 282 are in meshed engagement with a first side gear 284 and a second side gear 286. The first side gear 284 is coupled for rotation with the first axle shaft 16, and the second side gear 286 is coupled for rotation with the second axle shaft 18. A second actuator assembly (not depicted) may be utilized to actuate and selectively engage the second clutch assembly 250. The second actuator assembly may comprise, but is not limited to, a hydraulic actuator, an electromagnetic actuator, a cam actuator, or a ball and ramp actuator.

The electric drive axle assembly 200 further includes a sixth gear 213 in meshed engagement with the first gear 208 and the second gear 218. The sixth gear 213 receives torque from the first gear 208 and transmits torque to the second gear 218 when the electric motor 204 outputs torque to the output shaft 206.

In operation, when a first speed ratio is desired, the first actuator assembly 262 causes the first clutch assembly 225 to engage, while the second clutch assembly 250 remains disengaged. When the first clutch assembly 225 is engaged, the output shaft 206 of the electric motor 204 causes the output shaft 206 and the first gear 208 coupled thereto, to rotate therewith. Torque is transferred from the electric motor 204 to the first gear 208. A rotation of the first gear 208 drives the sixth gear 213, and thereby the second gear 218 of the compound idler assembly 212. Hence, the torque is then transferred from the first gear 208 to the second gear 218 via the sixth gear 213. Since the first clutch assembly 225 is engaged, the rotation of the second gear 218 causes the idler shaft 214 and the fourth gear 260 coupled thereto, to rotate therewith. The torque from the second gear 218 is then transferred to the idler shaft 214 via the first clutch assembly 225, and from the idler shaft 214 to the fourth gear 260. The torque transferred from the second gear 218 to the fourth gear 260 remains unchanged because the planetary gear assembly 240 freely rotates due to the second clutch assembly 250 being disengaged.

A rotation of the fourth gear 260 drives the fifth gear 272 of the differential mechanism 276, and causes the differential case 274 to rotate therewith. As such, the torque from the fourth gear 260 is transferred through the fifth gear 272 to the differential mechanism 276. A rotation of the differential case 274 further causes the first and second axle shafts 16, 18 to rotate therewith. The rotation of the differential mechanism 276 transfers a desired first torque from the differential mechanism 276 to the first and second axle shafts 16, 18. When the electric drive axle 200 is in a power generation mode, the torque transfer described above is reversed.

In certain embodiments, the first speed ratio may also be referred to as a highway ratio. The first speed ratio enables the electric drive axle assembly 200 to operate at low torque and high speed.

When a second speed ratio is desired, the first clutch assembly 225 is disengaged, while the second actuator assembly causes the second clutch assembly 250 to engage. When the second clutch assembly 250 is engaged, the output shaft 206 of the electric motor 204 causes the output shaft 206 and the first gear 208 coupled thereto, to rotate therewith. Torque is transferred from the electric motor 204 to the first gear 208. A rotation of the first gear 208 drives the sixth gear 213, and thereby the second gear 218 of the compound idler assembly 212. Hence, the torque is transferred from the first gear 208 to the second gear 218 via the sixth gear 213. Since the second gear 218 and the third gear 238 are disposed on the cylindrical shaft 239 and the second clutch assembly 250 is engaged, a rotation of the second gear 218 causes the cylindrical shaft 239 and the third gear 238 coupled thereto, to rotate therewith. The torque is then transferred from the first gear 208 to the third gear 238 via the second gear 218. Since the second clutch assembly 250 is engaged, a rotation of the third gear 238 drives the planet gears 242 and the planet carrier 244 coupled thereto. As such, the torque from the third gear 238 is then transferred to the planet carrier 244 via the planet gears 242. A rotation of the planet carrier 244 causes the idler shaft 214 and the fourth gear 260 coupled thereto, to rotate therewith. The torque from the planet carrier 244 is then transferred to the idler shaft 214 to the fourth gear 260. The torque transferred from the second gear 218 to the fourth gear 260 is increased because of the planetary gear assembly 240.

A rotation of the fourth gear 260 drives the fifth gear 272 of the differential mechanism 276, and causes the differential case 274 to rotate therewith. As such, the torque from the fourth gear 260 is transferred through the fifth gear 272 to the differential mechanism 276. A rotation of the differential case 274 further causes the first and second axle shafts 16, 18 to rotate therewith. The rotation of the differential mechanism 276 transfers a desired second torque from the differential mechanism 276 to the first and second axle shafts 16, 18. When the electric drive axle 200 is in a power generation mode, the torque transfer described above is reversed.

In certain embodiments, the second speed ratio may also be referred to as a crawl ratio. The second speed ratio enables the electric drive axle assembly 200 to operate at high torque and low speed.

Accordingly, the compound idler assembly 212 enables the electric drive axle assembly 200 to achieve a drive ratio span facilitating urban, rural, and highway driving as well as towing and rock crawling.

The high speed of electric motors presents obstacles to their use with conventional transmission gearbox designs. To prevent operating bearings disposed between a rotating clutch assembly and an actuator assembly at the high speeds produced by an electric motor, the compound idler assembly 212 locates the first and second clutch assemblies 225, 250 after a first gear reduction comprising the first gear 208 and the second gear 218.

Figure 4:
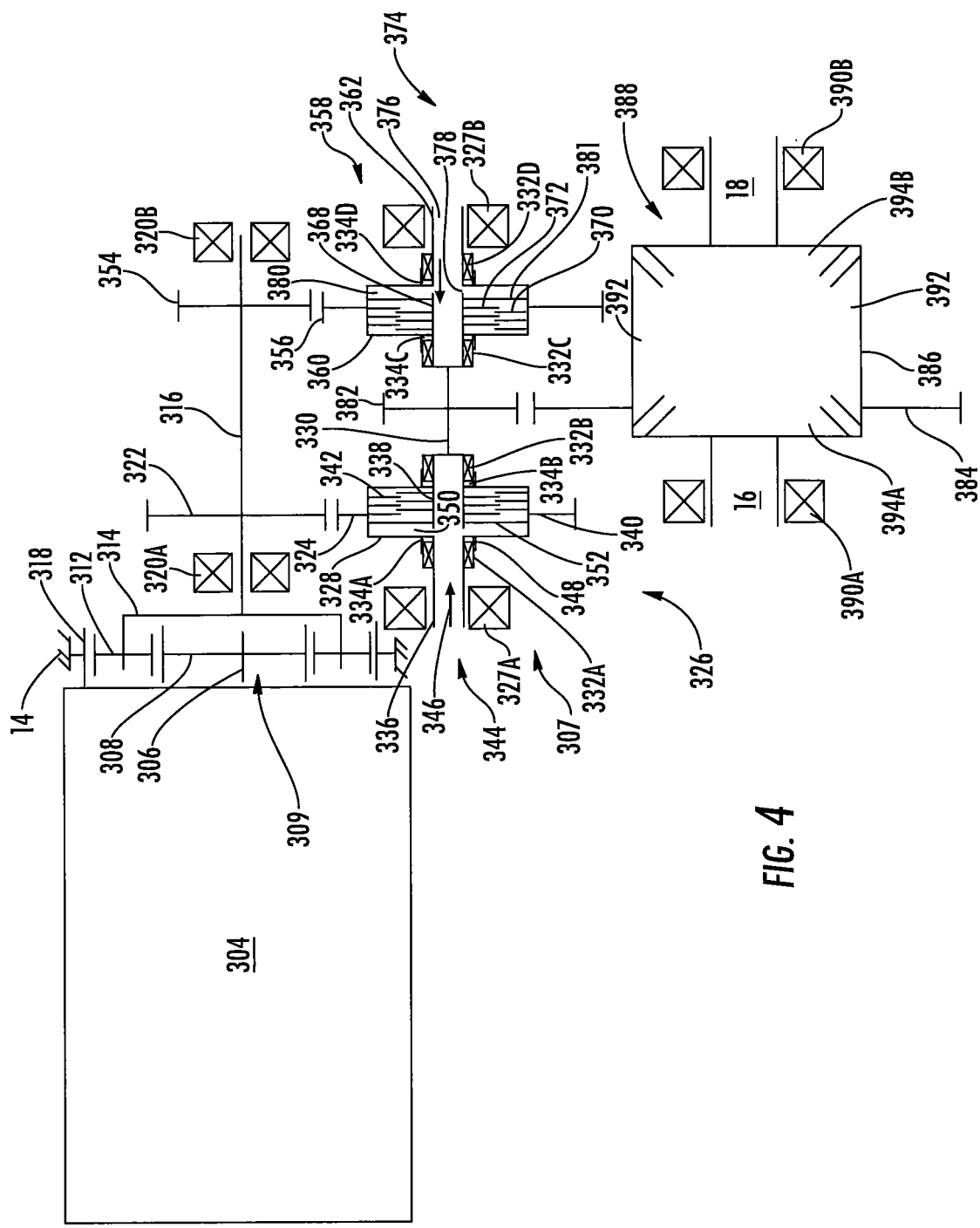
FIG. 4 is a schematic diagram of an electric axle assembly according to another embodiment of the presently disclosed subject matter.

Now referring to an embodiment shown in FIG. 4, the electric drive axle assembly 300 comprises an output shaft 306, axle shafts 16, 18, and a compound idler assembly 307 disposed offset and parallel to the motor output shaft relative to each other. In an embodiment, the electric drive axle 300 comprises the output shaft 306 coupled with the rotor of the electric motor 304 for rotation therewith. A first gear 308 may be coupled with the output shaft 306 and fixed for rotation therewith. In an embodiment, the first gear 308 is forged on the output shaft 306. In another embodiment, the first gear 308 may be welded to the output shaft 306. In still another embodiment, the first gear 308 may be splined to the output shaft 306. The first gear 308 may be a sun gear of a planetary gear assembly 309. The planetary gear assembly 309 may further comprise two or more planet gears 312 in meshed engagement with the first gear 308. The planet gears 312 may be rotatably disposed on planet pins (not depicted) coupled with a planet carrier 314. The planet carrier 314 may be coupled with a second shaft 316 and fixed for rotation therewith. The planet gears 312 may also be in meshed engagement with a ring gear 318 disposed at least partially concentrically about the planet gears 312 and the first gear 308. The ring gear 318 may be coupled with a stationary structure such as the axle housing 14, for example, and fixed thereto.

The second shaft 316 may be disposed coaxially with the output shaft 306 and may be rotatably supported in the axle housing 14 via first and second bearings 320A, 320B. A second gear 322 is coupled with the second shaft 316 and fixed for rotation therewith. The second gear 322 is in meshed engagement with a third gear 324. The third gear 324 is coupled with a first clutch drum 328 of a first clutch assembly 326. In certain embodiments, the compound idler assembly 307 includes the first clutch assembly 326. It is understood that the compound idler assembly 307 may be rotatably supported in the axle housing 14 via third and fourth bearings 327A, 327B Additionally, the first clutch drum 328 disposed at least partially concentrically within the third gear 324. A radially outer surface of the first clutch drum 328 is coupled with a radially inner surface of the third gear 324. In an embodiment, the first clutch drum 328 and the third gear 324 may be coupled via splined engagement. In another embodiment, the first clutch drum 328 and the third gear 324 may be coupled via an interference fit. In yet another embodiment, the third gear 324 and the first clutch drum 328 may comprise a unitary component. The first clutch drum 328 is rotatably supported on a third shaft 330 via fifth and sixth bearings 332A, 332B. Further, rotary sealing members 334A, 334B are disposed adjacent to the roller bearings 332A, 332B, respectively, to create a substantially fluid-tight seal between a portion of the first clutch drum 328 and a first portion 336 of the third shaft 330. The third gear 324 is entirely supported on the first portion 336 by the first clutch drum 328.

A first clutch hub 338 is disposed at least partially concentrically within the first clutch drum 328. In an embodiment, the first clutch hub 338 may be coupled for rotation with a first portion 336 of the third shaft 330. In an embodiment, the first clutch hub 338 may comprise a splined radially inner surface in meshed engagement with complimentary splines on the first portion 336 of the third shaft 330. In another embodiment, the first clutch hub 338 may be formed unitary and integral with the first portion 336 of the third shaft 330.

A first plurality of clutch plates 340 are coupled for rotation with the first clutch drum 328. The clutch plates 340 receive torque from the first clutch drum 328 and may move axially within the first clutch drum 328. A second plurality of clutch plates 342 are in meshed engagement with the first clutch hub 338. The second plurality of clutch plates 342 are interleaved with the first plurality of clutch plates 340. The second plurality of clutch plates 342 may move axially on the first clutch hub 338. The first clutch assembly 326 may be nested entirely within the third gear 324.

A first actuator assembly 344 may be utilized to selectively actuate the first clutch assembly 326. In an embodiment, as illustrated in FIG. 4, the first actuator assembly 344 may comprise a hydraulic actuator. In an embodiment, the first actuator assembly 344 comprises the first portion 336 of the third shaft 330. In an embodiment, the first portion 336 may have a generally cylindrical shape defining a fluid conduit 346. The first portion 336 may also comprise one more radially extending apertures 348 in fluid communication with both the fluid conduit 346 and a chamber 350. The chamber 350 may be defined by the first portion 336, a portion of the first clutch drum 328, the rotary sealing members 334A, 334B, and a pressure plate 352. The first actuator assembly 344 may also comprise a fluid reservoir (not depicted) in fluid communication with the fluid conduit 346. The fluid conduit 346 is in fluid communication with the chamber 350 via the one or more apertures 348. When the fluid pressure in the chamber 350 is increased via a pump (not depicted), the pressure plate 352 is axially actuated to frictionally engage the first and second pluralities of clutch plates 340, 342 of the first clutch assembly 326.

A fourth gear 354 is coupled with the second shaft 316 and fixed for rotation therewith. The fourth gear 354 is in meshed engagement with a fifth gear 356. The fifth gear 356 is coupled with a second clutch drum 360 of a second clutch assembly 358. In an embodiment, the second clutch assembly 358 comprises substantially the same components as the first clutch assembly 326 and is operated in substantially the same manner.

The second clutch drum 360 is disposed at least partially concentrically within the fifth gear 356. A radially outer surface of the second clutch drum 360 is coupled with a radially inner surface of the fifth gear 356. In an embodiment, the second clutch drum 360 and the fifth gear 356 may be coupled via splined engagement. In another embodiment, the second clutch drum 360 and the fifth gear 356 may be coupled via an interference fit. In yet another embodiment, the fifth gear 356 and the second clutch drum 360 may comprise a unitary component. The second clutch drum 360 is rotatably supported on the third shaft 330 via seventh and eighth bearings 332C, 332D. Further, rotary sealing members 334C, 334D are disposed adjacent to the bearings 332C, 332D, respectively, to create a substantially fluid-tight seal between a portion of the second clutch drum 360 and a second portion 362 of the third shaft 330. The fifth gear 356 is entirely supported on the second portion 362 by the second clutch drum 360.

A second clutch hub 368 is disposed at least partially concentrically within the second clutch drum 360. In an embodiment, the second clutch hub 368 may be coupled for rotation with a second portion 362 of the third shaft 330. In an embodiment, the second clutch hub 368 may comprise a splined radially inner surface in meshed engagement with complimentary splines on the second portion 362. In another embodiment, the second clutch hub 368 may be formed unitary and integral with the second portion 362 of the third shaft 330.

A first plurality of clutch plates 370 are coupled for rotation with the second clutch drum 360. The clutch plates 370 receive torque from the second clutch drum 360 and may move axially within the second clutch drum 360. A second plurality of clutch plates 372 are in meshed engagement with the second clutch hub 368. The second plurality of clutch plates 372 are interleaved with the first plurality of clutch plates 370. The second plurality of clutch plates 372 may move axially on the second clutch hub 368. The second clutch assembly 358 may be nested entirely within the fifth gear 356.

A second actuator assembly 374 may be utilized to selectively actuate the second clutch assembly 358. In an embodiment, as illustrated in FIG. 4, the second actuator assembly 374 may comprise a hydraulic actuator. In an embodiment, the second actuator assembly 374 comprises the second portion 362 of the third shaft 330. In an embodiment, the second portion 362 may have a generally cylindrical shape defining a fluid conduit 376. The second portion 362 may also comprise one more radially extending apertures 378 in fluid communication with both the fluid conduit 376 and a chamber 380. The chamber 380 may be defined by the second portion 362, a portion of the second clutch drum 360, the rotary sealing members 334C, 334D, and a pressure plate 381. The second actuator assembly 374 may also comprise a fluid reservoir (not depicted) in fluid communication with the fluid conduit 376. The fluid conduit 376 is in fluid communication with the chamber 380 via the one or more apertures 378. When the fluid pressure in the chamber 380 is increased via a pump (not depicted), the pressure plate 381 is axially actuated to frictionally engage the first and second pluralities of clutch plates 370, 372 of the second clutch assembly 358.

A sixth gear 382 is coupled with the third shaft 330 and fixed for rotation therewith. The sixth gear 382 is in meshed engagement with a seventh gear 384. The seventh gear 384 is coupled with, and fixed for rotation with, a differential case 386. The differential case 386 is part of a differential mechanism 388. The differential case 386 is rotatably supported within the axle housing 14 via bearings 390A, 390B. The differential mechanism 388 further includes two or more differential pinions 392. The differential pinions 392 are coupled within the differential case 386 via a pinion shaft (i.e., spider shaft) (not depicted). In an embodiment, the pinion shaft may comprise a cross member. The differential pinions 392 are in meshed engagement with first and second side gears 394A, 394B. The first side gear 394A is coupled for rotation with the first axle shaft 16, and the second side gear 394B is coupled for rotation with the second axle shaft 18.

In operation, when a first speed ratio is desired, the first actuator assembly 344 causes the first clutch assembly 326 to engage, while the second clutch assembly 358 remains disengaged. When the first clutch assembly 326 is engaged, the output shaft 306 of the electric motor 304 causes the output shaft 306 and the first gear 308 of the planetary gear assembly 309 coupled thereto, to rotate therewith. Torque is transferred from the electric motor 304 to the first gear 308. A rotation of the first gear 308 drives the planet gears 312 and the planet carrier 314 coupled thereto. As such, the torque from the first gear 308 is then transferred to the planet carrier 314 via the planet gears 312. A rotation of the planet carrier 314 causes the idler shaft 316, the second gear 322, and the fifth gear 354 coupled thereto, to rotate therewith. The torque from the planet carrier 314 is then transferred to the idler shaft 316 to the second gear 322 and the fifth gear 354. The torque transferred from the first gear 308 to the second gear 322 and the fifth gear 354 is increased because of the planetary gear assembly 309.

Because the first clutch assembly 326 is engaged, a rotation of the second gear 322 drives the third gear 324 of the compound idler assembly 307. Hence, the torque is then transferred from the first gear 308 to the third gear 324 via the second gear 322. A rotation of the third gear 324 causes the idler shaft 330 and the sixth gear 382 coupled thereto, to rotate therewith. The torque from the third gear 324 is then transferred to the idler shaft 330 via the first clutch assembly 326, and from the idler shaft 330 to the sixth gear 382.

A rotation of the sixth gear 382 drives the seventh gear 384 of the differential mechanism 388, and causes the differential case 386 to rotate therewith. As such, the torque from the sixth gear 382 is transferred through the seventh gear 384 to the differential mechanism 388. A rotation of the differential case 386 further causes the first and second axle shafts 16, 18 to rotate therewith. The rotation of the differential mechanism 388 transfers a desired first torque from the differential mechanism 388 to the first and second axle shafts 16, 18. When the electric drive axle 300 is in a power generation mode, the torque transfer described above is reversed.

In certain embodiments, the first speed ratio may also be referred to as a highway ratio. The first speed ratio enables the electric drive axle assembly 300 to operate at low torque and high speed.

When a second speed ratio is desired, the first clutch assembly 326 is disengaged, while the second actuator assembly 374 causes the second clutch assembly 358 to engage. When the second clutch assembly 358 is engaged, the output shaft 306 of the electric motor 304 causes the output shaft 306 and the first gear 308 coupled thereto, to rotate therewith. Torque is transferred from the electric motor 304 to the first gear 308.

A rotation of the first gear 308 drives the planet gears 312 and the planet carrier 314 coupled thereto. As such, the torque from the first gear 308 is then transferred to the planet carrier 314 via the planet gears 312. A rotation of the planet carrier 314 causes the idler shaft 316, the second gear 322, and the fifth gear 354 coupled thereto, to rotate therewith. The torque from the planet carrier 314 is then transferred to the idler shaft 316 to the second gear 322 and the fifth gear 354. The torque transferred from the first gear 308 to the second gear 322 and the fifth gear 354 is increased because of the planetary gear assembly 309.

Because the second clutch assembly 358 is engaged, a rotation of the fifth gear 354 drives the fourth gear 356 of the compound idler assembly 307. Hence, the torque is then transferred from the first gear 308 to the fourth gear 356 via the fifth gear 354. A rotation of the fourth gear 356 causes the idler shaft 330 and the sixth gear 382 coupled thereto, to rotate therewith. The torque from the third gear 324 is then transferred to the idler shaft 330 via the second clutch assembly 358, and from the idler shaft 330 to the sixth gear 382.

A rotation of the sixth gear 382 drives the seventh gear 384 of the differential mechanism 388, and causes the differential case 386 to rotate therewith. As such, the torque from the sixth gear 382 is transferred through the seventh gear 384 to the differential mechanism 388. A rotation of the differential case 386 further causes the first and second axle shafts 16, 18 to rotate therewith. The rotation of the differential mechanism 388 transfers a desired first torque from the differential mechanism 388 to the first and second axle shafts 16, 18. When the electric drive axle 300 is in a power generation mode, the torque transfer described above is reversed.

In certain embodiments, the second speed ratio may also be referred to as a crawl ratio. The second speed ratio enables the electric drive axle assembly 300 to operate at high torque and low speed.

Accordingly, the compound idler assembly 307 enables the electric drive axle assembly 300 to achieve a drive ratio span facilitating urban, rural, and highway driving as well as towing and rock crawling.

Figure 5:
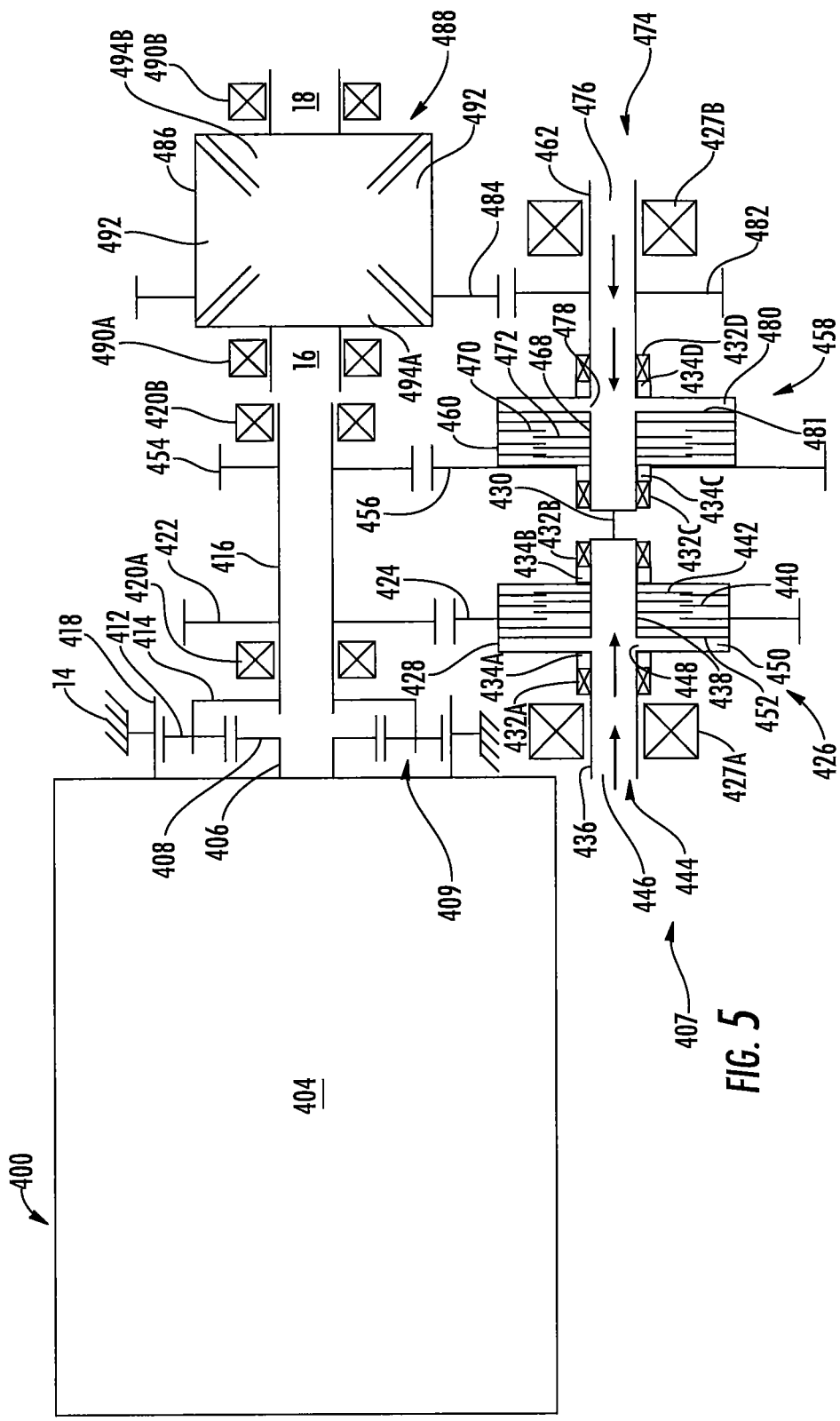
FIG. 5 is a schematic diagram of an electric axle assembly according to another embodiment of the presently disclosed subject matter.

In yet another embodiment shown in FIG. 5, the electric drive axle 400 comprises an output shaft 406 disposed coaxially with axle shafts 16, 18, and a compound idler assembly 407 disposed offset and parallel to the output shaft 406 and the axle shafts 16, 18. In an embodiment, the electric drive axle 400 comprises the output shaft 406 coupled with the rotor of the electric motor 404 for rotation therewith. A first gear 408 may be coupled with the output shaft 406 and fixed for rotation therewith. In an embodiment, the first gear 408 is forged on the output shaft 406. In another embodiment, the first gear 408 may be welded to the output shaft 406. In still another embodiment, the first gear 408 may be splined to the output shaft 406. The first gear 408 may be a sun gear of a planetary gear assembly 409. The planetary gear assembly 409 may further comprise two or more planet gears 412 in meshed engagement with the first gear 408. The planet gears 412 may be rotatably disposed on planet pins (not depicted) coupled with a planet carrier 414. The planet carrier 414 may be coupled with a second shaft 416 and fixed for rotation therewith. The planet gears 412 may also be in meshed engagement with a ring gear 418 disposed at least partially concentrically about the planet gears 412 and the first gear 408. The ring gear 418 may be coupled with a stationary structure such as the axle housing 14, for example, and fixed thereto.

The second shaft 416 may be disposed coaxially with the output shaft 406 and may be rotatably supported in the axle housing 14 via first and second bearings 420A, 420B. A second gear 422 is coupled with the second shaft 416 and fixed for rotation therewith. The second gear 422 is in meshed engagement with a third gear 424. The third gear 424 is coupled with a first clutch drum 428 of a first clutch assembly 426. In certain embodiments, the compound idler assembly 407 includes the first clutch assembly 426. It is understood that the compound idler assembly 407 may be rotatably supported in the axle housing 14 via third and fourth bearings 427A, 427B Additionally, the first clutch drum 428 disposed at least partially concentrically within the third gear 424. A radially outer surface of the first clutch drum 428 is coupled with a radially inner surface of the third gear 424. In an embodiment, the first clutch drum 428 and the third gear 424 may be coupled via splined engagement. In another embodiment, the first clutch drum 428 and the third gear 424 may be coupled via an interference fit. In yet another embodiment, the third gear 424 and the first clutch drum 428 may comprise a unitary component. The first clutch drum 428 is rotatably supported on a third shaft 430 via fifth and sixth bearings 432A, 432B. Further, rotary sealing members 434A, 434B are disposed adjacent to the roller bearings 432A, 432B, respectively, to create a substantially fluid-tight seal between a portion of the first clutch drum 428 and a first portion 436 of the third shaft 430. The third gear 424 is entirely supported on the first portion 436 by the first clutch drum 428.

A first clutch hub 438 is disposed at least partially concentrically within the first clutch drum 428. In an embodiment, the first clutch hub 438 may be coupled for rotation with the first portion 436 of the third shaft 430. In an embodiment, the first clutch hub 438 may comprise a splined radially inner surface in meshed engagement with complimentary splines on the first portion 436 of third shaft 430. In another embodiment, the first clutch hub 438 may be formed unitary and integral with the first portion 436 of the third shaft 430.

A first plurality of clutch plates 440 are coupled for rotation with the first clutch drum 428. The clutch plates 440 receive torque from the first clutch drum 428 and may move axially within the first clutch drum 428. A second plurality of clutch plates 442 are in meshed engagement with the first clutch hub 438. The second plurality of clutch plates 442 are interleaved with the first plurality of clutch plates 440. The second plurality of clutch plates 442 may move axially on the first clutch hub 438. The first clutch assembly 426 may be nested entirely within the third gear 424.

A first actuator assembly 444 may be utilized to selectively actuate the first clutch assembly 426. In an embodiment, as illustrated in FIG. 5, the first actuator assembly 444 may comprise a hydraulic actuator. In an embodiment, the first actuator assembly 444 comprises the first portion 436 of the third shaft 430. In an embodiment, the first portion 436 may have a generally cylindrical shape defining a fluid conduit 446. The first portion 436 may also comprise one more radially extending apertures 448 in fluid communication with both the fluid conduit 446 and a chamber 450. The chamber 450 may be defined by the first portion 436, a portion of the first clutch drum 428, the rotary sealing members 434A, 434B, and a pressure plate 452. The first actuator assembly 444 may also comprise a fluid reservoir (not depicted) in fluid communication with the fluid conduit 446. The fluid conduit 446 is in fluid communication with the chamber 450 via the one or more apertures 448. When the fluid pressure in the chamber 450 is increased via a pump (not depicted), the pressure plate 452 is axially actuated to frictionally engage the first and second pluralities of clutch plates 440, 442 of the first clutch assembly 426.

A fourth gear 454 is coupled with the second shaft 416 and fixed for rotation therewith. The fourth gear 454 is in meshed engagement with a fifth gear 456. The fifth gear 456 is coupled with a second clutch drum 460 of a second clutch assembly 458. In an embodiment, the second clutch assembly 458 comprises substantially the same components as the first clutch assembly 426 and is operated in substantially the same manner.

The second clutch drum 460 is disposed at least partially concentrically within the fifth gear 456. A radially outer surface of the second clutch drum 460 is coupled with a radially inner surface of the fifth gear 456. In an embodiment, the second clutch drum 460 and the fifth gear 456 may be coupled via splined engagement. In another embodiment, the second clutch drum 460 and the fifth gear 456 may be coupled via an interference fit. In yet another embodiment, the fifth gear 456 and the second clutch drum 460 may comprise a unitary component. The second clutch drum 460 is rotatably supported on the third shaft 430 via seventh and eighth bearings 432C, 432D. Further, rotary sealing members 434C, 434D are disposed adjacent to the bearings 432C, 432D, respectively, to create a substantially fluid-tight seal between a portion of the second clutch drum 460 and a second portion 462 of the third shaft 430. The fifth gear 456 is entirely supported on the second portion 462 by the second clutch drum 460.

A second clutch hub 468 is disposed at least partially concentrically within the second clutch drum 460. In an embodiment, the second clutch hub 468 may be coupled for rotation with a second portion 462 of the third shaft 430. In an embodiment, the second clutch hub 468 may comprise a splined radially inner surface in meshed engagement with complimentary splines on the second portion 462. In another embodiment, the second clutch hub 468 may be formed unitary and integral with the second portion 462 of the third shaft 430.

A first plurality of clutch plates 470 are coupled for rotation with the second clutch drum 460. The clutch plates 470 receive torque from the second clutch drum 460 and may move axially within the second clutch drum 460. A second plurality of clutch plates 472 are in meshed engagement with the second clutch hub 468. The second plurality of clutch plates 472 are interleaved with the first plurality of clutch plates 470. The second plurality of clutch plates 472 may move axially on the second clutch hub 468. The second clutch assembly 458 may be nested entirely within the fifth gear 456.

A second actuator assembly 474 may be utilized to selectively actuate the second clutch assembly 458. In an embodiment, as illustrated in FIG. 4, the second actuator assembly 474 may comprise a hydraulic actuator. In an embodiment, the second actuator assembly 474 comprises the second portion 462 of the third shaft 430. In an embodiment, the second portion 462 may have a generally cylindrical shape defining a fluid conduit 476. The second portion 462 may also comprise one more radially extending apertures 478 in fluid communication with both the fluid conduit 476 and a chamber 480. The chamber 480 may be defined by the second portion 462, a portion of the second clutch drum 460, the rotary sealing members 434C, 434D, and a pressure plate 481. The second actuator assembly 474 may also comprise a fluid reservoir (not depicted) in fluid communication with the fluid conduit 476. The fluid conduit 476 is in fluid communication with the chamber 480 via the one or more apertures 478. When the fluid pressure in the chamber 480 is increased via a pump (not depicted), the pressure plate 481 is axially actuated to frictionally engage the first and second pluralities of clutch plates 470, 472 of the second clutch assembly 458.

A sixth gear 482 is coupled with the third shaft 430 and fixed for rotation therewith. In certain embodiments, the sixth gear 482 is disposed axially outboard of the second clutch assembly 458. The sixth gear 482 is in meshed engagement with a seventh gear 484. The seventh gear 484 is coupled with, and fixed for rotation with, a differential case 486. The differential case 486 is part of a differential mechanism 488. The differential case 486 is rotatably supported within the axle housing 14 via bearings 490A, 490B. The differential mechanism 488 further includes two or more differential pinions 492. The differential pinions 492 are coupled within the differential case 486 via a pinion shaft (i.e., spider shaft) (not depicted). In an embodiment, the pinion shaft may comprise a cross member. The differential pinions 492 are in meshed engagement with first and second side gears 494A, 494B. The first side gear 494A is coupled for rotation with the first axle shaft 16, and the second side gear 494B is coupled for rotation with the second axle shaft 18.

In operation, when a first speed ratio is desired, the first actuator assembly 444 causes the first clutch assembly 426 to engage, while the second clutch assembly 458 remains disengaged. When the first clutch assembly 426 is engaged, the output shaft 406 of the electric motor 404 causes the output shaft 406 and the first gear 408 of the planetary gear assembly 409 coupled thereto, to rotate therewith. Torque is transferred from the electric motor 404 to the first gear 408. A rotation of the first gear 408 drives the planet gears 412 and the planet carrier 414 coupled thereto. As such, the torque from the first gear 408 is then transferred to the planet carrier 414 via the planet gears 412. A rotation of the planet carrier 414 causes the idler shaft 416, the second gear 422, and the fifth gear 454 coupled thereto, to rotate therewith. The torque from the planet carrier 414 is then transferred to the idler shaft 416 to the second gear 422 and the fifth gear 454. The torque transferred from the first gear 408 to the second gear 422 and the fifth gear 454 is increased because of the planetary gear assembly 409.

Because the first clutch assembly 426 is engaged, a rotation of the second gear 422 drives the third gear 424 of the compound idler assembly 407. Hence, the torque is then transferred from the first gear 408 to the third gear 424 via the second gear 422. A rotation of the third gear 424 causes the idler shaft 430 and the sixth gear 482 coupled thereto, to rotate therewith. The torque from the third gear 424 is then transferred to the idler shaft 430 via the first clutch assembly 426, and from the idler shaft 430 to the sixth gear 482.

A rotation of the sixth gear 482 drives the seventh gear 484 of the differential mechanism 488, and causes the differential case 486 to rotate therewith. As such, the torque from the sixth gear 482 is transferred through the seventh gear 484 to the differential mechanism 488. A rotation of the differential case 486 further causes the first and second axle shafts 16, 18 to rotate therewith. The rotation of the differential mechanism 488 transfers a desired first torque from the differential mechanism 488 to the first and second axle shafts 16, 18. When the electric drive axle 400 is in a power generation mode, the torque transfer described above is reversed.

In certain embodiments, the first speed ratio may also be referred to as a highway ratio. The first speed ratio enables the electric drive axle assembly 400 to operate at low torque and high speed.

When a second speed ratio is desired, the first clutch assembly 426 is disengaged, while the second actuator assembly 474 causes the second clutch assembly 458 to engage. When the second clutch assembly 458 is engaged, the output shaft 406 of the electric motor 404 causes the output shaft 406 and the first gear 408 coupled thereto, to rotate therewith. Torque is transferred from the electric motor 404 to the first gear 408.

A rotation of the first gear 408 drives the planet gears 412 and the planet carrier 414 coupled thereto. As such, the torque from the first gear 408 is then transferred to the planet carrier 414 via the planet gears 412. A rotation of the planet carrier 414 causes the idler shaft 416, the second gear 422, and the fifth gear 454 coupled thereto, to rotate therewith. The torque from the planet carrier 414 is then transferred to the idler shaft 416 to the second gear 422 and the fifth gear 454. The torque transferred from the first gear 408 to the second gear 422 and the fifth gear 454 is increased because of the planetary gear assembly 409.

Because the second clutch assembly 458 is engaged, a rotation of the fifth gear 454 drives the fourth gear 456 of the compound idler assembly 407. Hence, the torque is then transferred from the first gear 408 to the fourth gear 456 via the fifth gear 454. A rotation of the fourth gear 456 causes the idler shaft 430 and the sixth gear 482 coupled thereto, to rotate therewith. The torque from the third gear 424 is then transferred to the idler shaft 430 via the second clutch assembly 458, and from the idler shaft 430 to the sixth gear 482.

A rotation of the sixth gear 482 drives the seventh gear 484 of the differential mechanism 488, and causes the differential case 486 to rotate therewith. As such, the torque from the sixth gear 482 is transferred through the seventh gear 484 to the differential mechanism 488. A rotation of the differential case 486 further causes the first and second axle shafts 16, 18 to rotate therewith. The rotation of the differential mechanism 488 transfers a desired first torque from the differential mechanism 488 to the first and second axle shafts 16, 18. When the electric drive axle 400 is in a power generation mode, the torque transfer described above is reversed.

In certain embodiments, the second speed ratio may also be referred to as a crawl ratio. The second speed ratio enables the electric drive axle assembly 400 to operate at high torque and low speed.

Accordingly, the compound idler assembly 407 enables the electric drive axle assembly 400 to achieve a drive ratio span facilitating urban, rural, and highway driving as well as towing and rock crawling.

Figure 6:
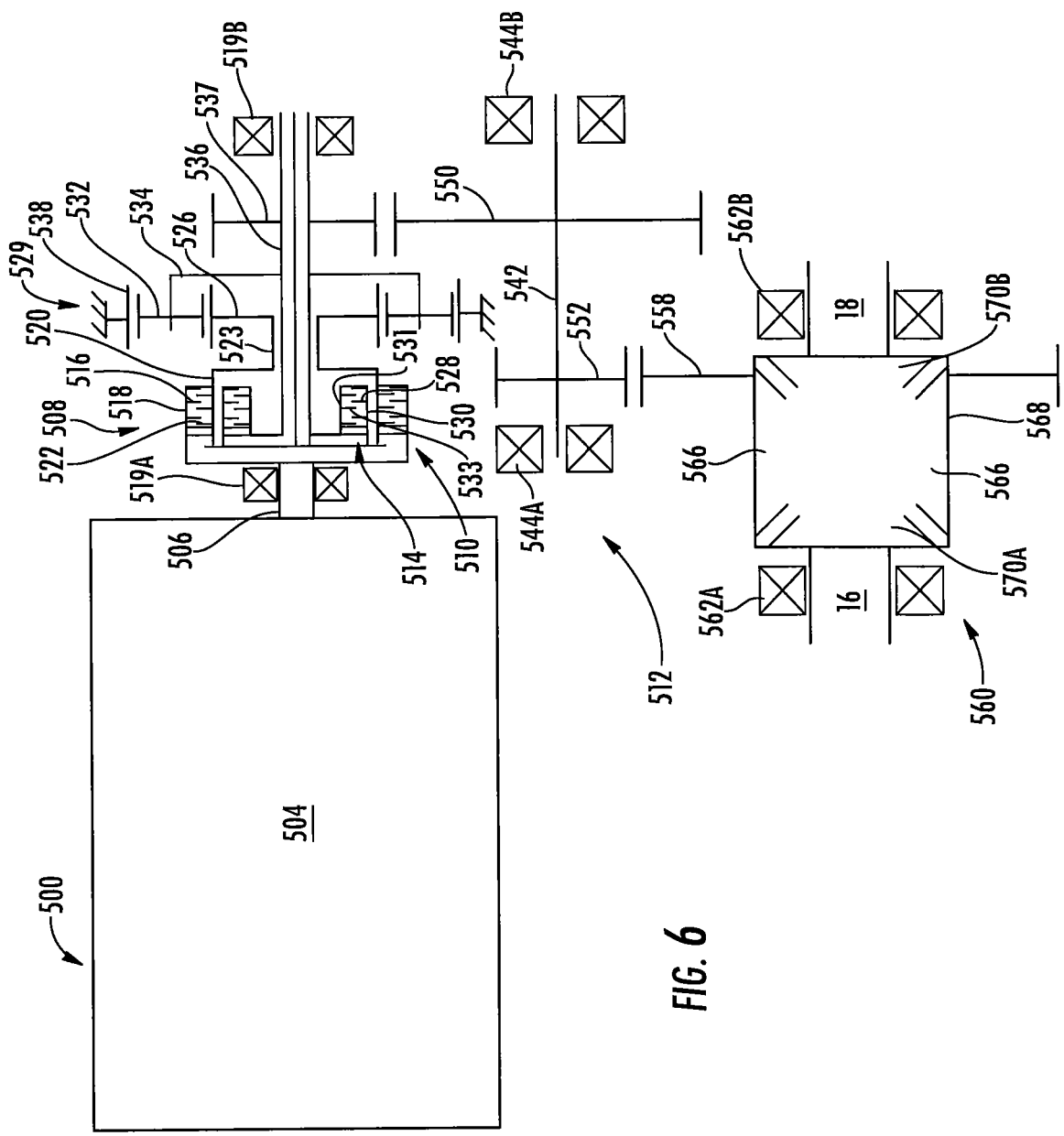
FIG. 6 is a schematic diagram of an electric axle assembly according to another embodiment of the presently disclosed subject matter.

As illustrated in FIG. 6, in another embodiment, an electric drive axle assembly 500 comprises an output shaft 506, axle shafts 16, 18, and a compound idler assembly 512 disposed offset and parallel to the output shaft 506 relative to each other. In certain embodiments, the output shaft 506 is coupled with the rotor of the electric motor 504 for rotation therewith. The output shaft 506 shown is connected to a concentric dual clutch 508. It should be appreciated that any type of clutch 508 can be employed as desired such as a wet clutch assembly, a simple dog clutch assembly, a dog clutch assembly with a synchronizer, and the like, for example.

In the embodiment shown, the clutch 508 includes a first or outer clutch assembly 510 concentrically disposed about the output shaft 506 and a second or inner clutch assembly 514 concentrically disposed about the output shaft 506 and radially within the first clutch assembly 510. The clutch assemblies 510, 514 may be positioned radially adjacent to each other such that a single actuator mechanism (not depicted) can separately actuate each of the clutch assemblies 510, 514. Accordingly, only one of the clutch assemblies 510, 514 is engaged at any one time. The actuator mechanism can include an actuator, an additional gear set and a roller and ramp assembly. The actuator may be a reversible electric motor as it is compact and easily controllable. It is understood that any other appropriate type of actuator and actuator mechanism may be used such as hydraulic or pneumatic actuators, for example.

In the embodiment shown, the first clutch assembly 510 includes a set of clutch plates 516 extending radially inward from a first clutch hub 518. The clutch plates 516 are mounted for axial movement with the first clutch hub 518. The first clutch assembly 510 further includes a second clutch hub 520. The second clutch hub 520 has a set of clutch plates 522 extending radially outward from the second clutch hub 520. The clutch plates 522 interleave with the clutch plates 516. It should be appreciated that the first clutch assembly 510 may include any number of clutch plates 516, 522 as desired. The second clutch hub 520 is connected to a common shaft 523. The common shaft 523 is disposed co-axially with the output shaft 506 and may be rotatably supported in a stationary structure (e.g. the axle housing 14) by at least one bearing (not depicted). It is understood that the at least one bearing can be any type of bearing as desired such as a roller bearing, a ball bearing, a tapered bearing, and the like, for example.

A first gear 526 is coupled for rotation with the common shaft 523. In certain embodiments, the first gear 526 may be a sun gear of a planetary gear assembly 529. The planetary gear assembly 529 may further comprise two or more planet gears 532 in meshed engagement with the first gear 526. The planet gears 532 may be rotatably disposed on planet pins (not depicted) coupled with a planet carrier 534. The planet carrier 534 may be coupled with a second shaft 536 and fixed for rotation therewith. The output shaft 506 and the second shaft 536 may be rotatably supported in a stationary structure such as the axle housing 14, for example, first and second bearings 519A, 519B. It is understood that the at least one bearing can be any type of bearing as desired such as a needle bearing, a roller bearing, a ball bearing, a tapered bearing, and the like, for example. The planet gears 532 may also be in meshed engagement with a ring gear 538 disposed at least partially concentrically about the planet gears 532 and the first gear 526. The ring gear 538 may be coupled with a stationary structure such as the axle housing 14, for example, and fixed thereto. Accordingly, the electric motor 504 drives the first gear 526 of the planetary gear assembly 529 when the first clutch assembly 510 is engaged.

As illustrated, the second clutch assembly 514 includes a set of clutch plates 528 extending radially inward from a first clutch hub 530. The clutch plates 528 are mounted for axial movement with the first clutch hub 530. The second clutch assembly 514 further includes a second clutch hub 531 having a set of clutch plates 533 extending radially outward from the second clutch hub 531. The clutch plates 533 interleave with the clutch plates 528. It should also be appreciated that the second clutch assembly 514 may include any number of clutch plates 528, 533 as desired. A second gear 537 is drivingly connected to the second clutch assembly 514. In certain embodiments, the second gear 537 is concentrically disposed about the second shaft 536 between the first gear 526 and the second bearing 519B. Accordingly, the electric motor 504 drives the second gear 537 when the second clutch assembly 514 is engaged.

In certain embodiments, the electric motor 504 drives the compound idler assembly 512 via the planetary gear assembly 529 and the second gear 537 when the first clutch assembly 510 is engaged, or via the second gear 537 when the second clutch assembly 514 is engaged. As illustrated in FIG. 6, the compound idler assembly 512 is disposed parallel with the output shaft 506 of the electric motor 504. The compound idler assembly 512 comprises an idler shaft 542 rotatably supported in the stationary structure (e.g. the axle housing 14) via third and fourth bearings 544A, 544B. It is understood that each of the bearings 544A, 544B can be any type of bearing as desired such as a roller bearing, a ball bearing, a tapered bearing, and the like, for example.

Third and fourth gears 550, 552, respectively, are coupled for rotation with the idler shaft 542. The third gear 550 is disposed axially adjacent to the second bearing 544B. The fourth gear 552 is disposed axially adjacent the first bearing 544A. The third gear 550 is in meshed engagement with the second gear 537 and receives torque therefrom when one of the clutches 510, 514 is engaged and the electric motor 504 drives the electric drive axle assembly 500. A pair of positioning elements (not depicted) may be respectively disposed on ends of the idler shaft 542 to maintain a position of the bearings 544A, 544B and the third and fourth gears 550, 552. It is understood that each of the positioning elements can be any type of positioning element as desired such as a snap ring, for example but could use a shim and press fit bearings if the application allows for it.

As illustrated, the fourth gear 552 is in meshed engagement with a fifth gear 558. The fourth gear 552 drives the fifth gear 558, when one of the first and second clutches 510, 514, respectively, is engaged and the electric motor 504 drives the electric drive axle assembly 500. The fifth gear 558 is coupled for rotation with a differential mechanism 560. The differential mechanism 560 is rotatably supported within the stationary structure (e.g. the axle housing 14) via a pair of bearings 562A, 562B. It is understood that each of the bearings 562A, 562B can be any type of bearing as desired such as a roller bearing, a ball bearing, a tapered bearing, and the like, for example.

As illustrated in FIG. 6, the differential mechanism 560 includes two or more differential pinions 566 disposed within a differential case 568. The differential pinions 566 are coupled with the differential case 568 via a pinion shaft (not depicted). In an embodiment, the pinion shaft may comprise a cross member. The differential pinions 566 are in meshed engagement with first and second side gears 570A, 570B. The first and second side gears 570A, 570B are coupled for rotation with the first and second half shafts 16, 18, respectively.

In operation, when a first speed ratio is desired, the first actuator assembly causes the first clutch assembly 510 to engage, while the second clutch assembly 514 remains disengaged. When the first clutch assembly 510 is engaged, the output shaft 506 of the electric motor 504 causes the output shaft 506 and the first gear 526 of the planetary gear assembly 529 coupled thereto, to rotate therewith. Torque is transferred from the electric motor 504 to the first gear 526. A rotation of the first gear 526 drives the planet gears 532 and the planet carrier 529 coupled thereto. As such, the torque from the first gear 526 is then transferred to the planet carrier 534 via the planet gears 532. A rotation of the planet carrier 534 causes the idler shaft 536 and the second gear 537 coupled thereto, to rotate therewith. The torque from the planet carrier 534 is then transferred through the idler shaft 536 to the second gear 537. The torque transferred from the output shaft 506 to the second gear 537 is increased because of the planetary gear assembly 529.

Because the first clutch assembly 510 is engaged, a rotation of the second gear 537 drives the third gear 550 of the compound idler assembly 512. Hence, the torque is then transferred from the first gear 526 through the planetary gear assembly 529 to the third gear 550 via the second gear 537. A rotation of the third gear 550 causes the idler shaft 542 and the fourth gear 552 coupled thereto, to rotate therewith. The torque from the third gear 550 is then transferred through the idler shaft 542 to the fourth gear 552.

A rotation of the fourth gear 552 drives the fifth gear 558 of the differential mechanism 560, and causes the differential case 568 to rotate therewith. As such, the torque from the fourth gear 552 is transferred through the fifth gear 558 to the differential mechanism 560. A rotation of the differential case 568 further causes the first and second axle shafts 16, 18 to rotate therewith. The rotation of the differential mechanism 560 transfers a desired first torque from the differential mechanism 560 to the first and second axle shafts 16, 18. When the electric drive axle 500 is in a power generation mode, the torque transfer described above is reversed.

In certain embodiments, the first speed ratio may also be referred to as a crawl ratio. The first speed ratio enables the electric drive axle assembly 500 to operate at high torque and low speed.

When a second speed ratio is desired, the first clutch assembly 510 is disengaged, while the second actuator assembly causes the second clutch assembly 514 to engage. When the second clutch assembly 514 is engaged, the output shaft 506 of the electric motor 504 causes the output shaft 506 and the second gear 537 coupled to the idler shaft 536, to rotate therewith. The torque transferred from the electric motor 504 to the second gear 537 remains unchanged.

Because the second clutch assembly 514 is engaged, a rotation of the second gear 537 drives the third gear 550 of the compound idler assembly 512. Hence, the torque is then transferred from the first gear 526 through the planetary gear assembly 529 to the third gear 550 via the second gear 537. A rotation of the third gear 550 causes the idler shaft 542 and the fourth gear 552 coupled thereto, to rotate therewith. The torque from the third gear 550 is then transferred through the idler shaft 542 to the fourth gear 552.

A rotation of the fourth gear 552 drives the fifth gear 558 of the differential mechanism 560, and causes the differential case 568 to rotate therewith. As such, the torque from the fourth gear 552 is transferred through the fifth gear 558 to the differential mechanism 560. A rotation of the differential case 568 further causes the first and second axle shafts 16, 18 to rotate therewith. The rotation of the differential mechanism 560 transfers a desired first torque from the differential mechanism 560 to the first and second axle shafts 16, 18. When the electric drive axle 500 is in a power generation mode, the torque transfer described above is reversed.

In certain embodiments, the second speed ratio may also be referred to as a highway ratio. The second speed ratio enables the electric drive axle assembly 500 to operate at low torque and high speed.

Accordingly, the compound idler assembly 512 enables the electric drive axle assembly 500 to achieve a drive ratio span facilitating urban, rural, and highway driving as well as towing and rock crawling.

Figure 7:
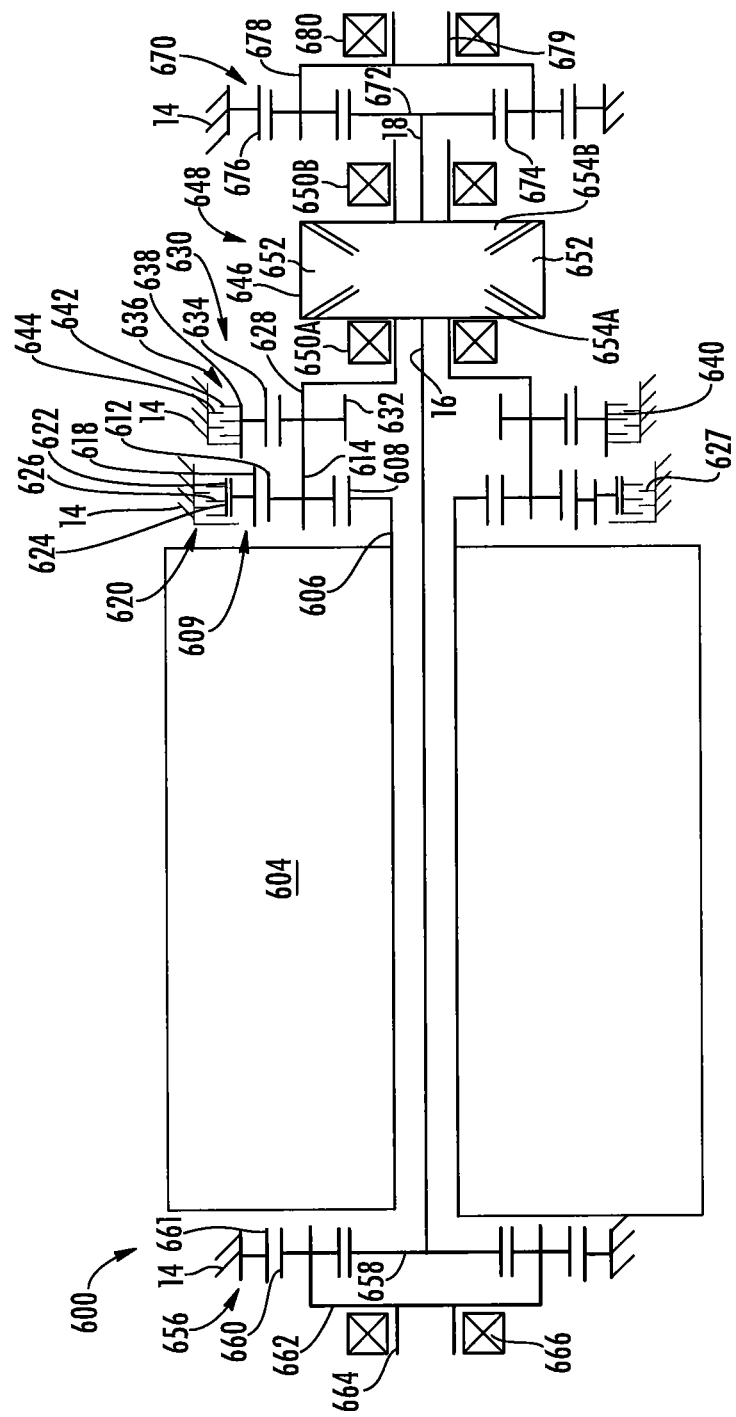
FIG. 7 is a schematic diagram of an electric axle assembly according to another embodiment of the presently disclosed subject matter.

FIG. 7 illustrates an electric drive axle assembly 600. The electric drive axle assembly 600 comprises an output shaft 606 and axle shafts 16, 18 disposed coaxially with the output shaft 606. In certain embodiments, the output shaft 606 is coupled with the rotor of the electric motor 604 for rotation therewith.

A first gear 608 may be coupled with the output shaft 606 and fixed for rotation therewith. In an embodiment, the first gear 608 is forged on the output shaft 606. In another embodiment, the first gear 608 may be welded to the output shaft 606. In still another embodiment, the first gear 608 may be splined to the output shaft 606. The first gear 608 may be a sun gear of a first planetary gear assembly 609. The first planetary gear assembly 609 may further comprise two or more planet gears 612 in meshed engagement with the first gear 608. The planet gears 612 may be rotatably disposed on planet pins (not depicted) coupled with a planet carrier 614. The planet gears 612 may also be in meshed engagement with a ring gear 618 disposed at least partially concentrically about the planet gears 612 and the first gear 608. The ring gear 618 may be selectively coupled with a stationary structure such as the axle housing 14, for example, via a first clutch assembly 620. In certain embodiments, the ring gear 618 is coupled with a first clutch drum 622 of the first clutch assembly 620.

As shown, a radially inner surface of the first clutch drum 622 is coupled with a radially outer surface of the ring gear 618. In an embodiment, the first clutch drum 622 and the ring gear 618 may be coupled via splined engagement. In another embodiment, the first clutch drum 622 and the ring gear 618 may be coupled via an interference fit. In yet another embodiment, the ring gear 618 and the first clutch drum 622 may comprise a unitary component. A first clutch hub 624 is disposed at least partially concentrically within the first clutch drum 622. A first plurality of clutch plates 624 are coupled for rotation with the first clutch drum 622. The clutch plates 624 receive torque from the first clutch drum 622 and may move axially within the first clutch drum 622. A second plurality of clutch plates 626 are in meshed engagement with the stationary structure such as the axle housing 14, for example. The second plurality of clutch plates 626 are interleaved with the first plurality of clutch plates 624. The second plurality of clutch plates 626 may move axially on the stationary structure. A first actuator assembly (not depicted) may be utilized to selectively actuate the first clutch assembly 620. Various types of actuators may be employed as the first actuator assembly such as a hydraulic actuator, for example.

In certain embodiments, the planet carrier 614 may be coupled with a planet carrier 628 of a second planetary gear assembly 630. The second planetary gear assembly 630 may further comprise two or more planet gears 632. The planet gears 632 may be rotatably disposed on planet pins (not depicted) coupled with the planet carrier 628. The planet gears 632 may also be in meshed engagement with a ring gear 634 disposed at least partially concentrically about the planet gears 632. The ring gear 634 may be selectively coupled with a stationary structure such as the axle housing 14, for example, via a second clutch assembly 636. In certain embodiments, the ring gear 634 is coupled with a second clutch drum 638 of the second clutch assembly 636.

As shown, a radially inner surface of the second clutch drum 638 is coupled with a radially outer surface of the ring gear 634. In an embodiment, the second clutch drum 638 and the ring gear 634 may be coupled via splined engagement. In another embodiment, the second clutch drum 638 and the ring gear 634 may be coupled via an interference fit. In yet another embodiment, the ring gear 634 and the second clutch drum 638 may comprise a unitary component. A second clutch hub 640 is disposed at least partially concentrically within the second clutch drum 638. A first plurality of clutch plates 642 are coupled for rotation with the second clutch drum 638. The clutch plates 642 receive torque from the second clutch drum 638 and may move axially within the second clutch drum 638. A second plurality of clutch plates 644 are in meshed engagement with the stationary structure such as the axle housing 14, for example. The second plurality of clutch plates 644 are interleaved with the first plurality of clutch plates 642. The second plurality of clutch plates 644 may move axially on the stationary structure. A second actuator assembly (not depicted) may be utilized to selectively actuate the second clutch assembly 636. Various types of actuators may be employed as the second actuator assembly such as a hydraulic actuator, for example.

In certain embodiments, the planet carrier 628 is coupled with, and fixed for rotation with, a differential case 646. The differential case 646 is part of a differential mechanism 648. The differential case 646 is rotatably supported within the axle housing 14 via bearings 650A, 650B. The differential mechanism 648 further includes two or more differential pinions 652. The differential pinions 652 are coupled within the differential case 646 via a pinion shaft (i.e., spider shaft) (not depicted). In an embodiment, the pinion shaft may comprise a cross member. The differential pinions 652 are in meshed engagement with first and second side gears 654A, 654B. The first side gear 654A is coupled for rotation with the first axle shaft 16, and the second side gear 654B is coupled for rotation with the second axle shaft 18.

As illustrated in FIG. 7, in an embodiment, the first axle shaft 16 may be coupled to third planetary gear assembly 656. In certain embodiments, the third planetary gear assembly 656 includes a sun or second gear 658 coupled to the first axle shaft 16. The third planetary gear assembly 656 shown may further comprise two or more planet gears 660 in meshed engagement with the second gear 658. The planet gears 660 may be in meshed engagement with a ring gear 661 disposed at least partially concentrically about the planet gears 660 and the second gear 658. The ring gear 661 may be coupled with a stationary structure such as the axle housing 14, for example, and fixed thereto. The planet gears 660 may also be rotatably disposed on planet pins (not depicted) coupled with a planet carrier 662. The planet carrier 662 may be coupled with a third axle shaft 664 fixed for rotation therewith. The third axle shaft 664 may be rotatably supported in a stationary structure such as the axle housing 14, for example, by a bearing 666. It is understood that the bearing 666 can be any type of bearing as desired such as a needle bearing, a roller bearing, a ball bearing, a tapered bearing, and the like, for example. In certain embodiments, the third axle shaft 664 may be drivingly connected to a wheel 6 of the vehicle 10, shown in FIG. 1.

Similarly, the second axle shaft 18 may be coupled to fourth planetary gear assembly 670. In certain embodiments, the fourth planetary gear assembly 670 includes a sun or third gear 672 coupled to the second axle shaft 18. The fourth planetary gear assembly 670 shown may further comprise two or more planet gears 674 in meshed engagement with the third gear 672. The planet gears 674 may be in meshed engagement with a ring gear 676 disposed at least partially concentrically about the planet gears 674 and the third gear 670. The ring gear 676 may be coupled with a stationary structure such as the axle housing 14, for example, and fixed thereto. The planet gears 674 may also be rotatably disposed on planet pins (not depicted) coupled with a planet carrier 678. The planet carrier 678 may be coupled with a fourth axle shaft 679 fixed for rotation therewith. The fourth axle shaft 679 may be rotatably supported in a stationary structure such as the axle housing 14, for example, by a bearing 680. It is understood that the bearing 680 can be any type of bearing as desired such as a needle bearing, a roller bearing, a ball bearing, a tapered bearing, and the like, for example. In certain embodiments, the fourth axle shaft 679 may be drivingly connected to a wheel 8 of the vehicle 10, shown in FIG. 1.

In operation, when a first speed ratio is desired, the first actuator assembly causes the first clutch assembly 620 to engage, while the second clutch assembly 636 remains disengaged. When the first clutch assembly 620 is engaged, the output shaft 606 of the electric motor 604 causes the output shaft 606 and the first gear 608 of the first planetary gear assembly 609 coupled thereto, to rotate therewith. Torque is transferred from the electric motor 604 to the first gear 608. A rotation of the first gear 608 drives the planet gears 612 and the planet carrier 614 coupled thereto. As such, the torque from the first gear 608 is then transferred to the planet carrier 614 via the planet gears 612. A rotation of the planet carrier 614 causes the second planetary gear assembly 630, and the differential mechanism 648 coupled thereto, to rotate therewith. The torque from the planet carrier 614 is then transferred through the second planetary gear assembly 630 to the differential case 646. Because the first clutch assembly 620 is engaged, the torque transferred from the first gear 608 to the differential mechanism 648 is increased because of the first planetary gear assembly 609. The torque transferred from the planet carrier 614 through the second planetary gear assembly 630 remains unchanged because the second planetary gear assembly 630 freely rotates due to the second clutch assembly 636 being disengaged.

A rotation of the differential case 646 further causes the first and second axle shafts 16, 18 to rotate therewith. The rotation of the differential mechanism 648 transfers a desired first torque from the differential mechanism 648 to the first and second axle shafts 16, 18.

A rotation of the first axle shaft 16 causes a rotation of the second gear 658 of the third planetary gear assembly 656 coupled thereto, to rotate therewith. Torque is transferred from the axle shaft 16 to the second gear 658. A rotation of the second gear 658 drives the planet gears 660 and the planet carrier 662 coupled thereto. As such, the torque from the second gear 658 is then transferred to the planet carrier 662 via the planet gears 660. A rotation of the planet carrier 662 causes the third planetary gear assembly 656, and the third axle shaft 664 coupled thereto, to rotate therewith. The torque from the planet carrier 662 is then transferred through the third axle shaft 664 to the wheel 6, shown in FIG. 1. When the electric drive axle 600 is in a power generation mode, the torque transfer described above is reversed.

In certain embodiments, the first speed ratio may also be referred to as a crawl ratio. The first speed ratio enables the electric drive axle assembly 600 to operate at high torque and low speed.

When a second speed ratio is desired, the second actuator assembly causes the second clutch assembly 636 to engage, while the first clutch assembly 620 remains disengaged. When the second clutch assembly 636 is engaged, the output shaft 606 of the electric motor 604 causes the output shaft 606 and the first gear 608 of the first planetary gear assembly 609 coupled thereto, to rotate therewith. Torque is transferred from the electric motor 604 to the first gear 608. A rotation of the first gear 608 causes the planet carrier 614 of the first planetary gear system 609 and the planet carrier 628 of the second planetary gear system 630 to rotate. Since the second clutch assembly 636 is engaged, the torque from the first gear 608 is then transferred to the planet carrier 628. A rotation of the planet carrier 628 causes the differential mechanism 648 coupled thereto, to rotate therewith. The torque from the planet carrier 628 is then transferred through the second planetary gear assembly 630 to the differential case 646. Because the first clutch assembly 620 is disengaged, the torque transferred from the first gear 608 to the differential mechanism 648 remains unchanged because the first planetary gear assembly 620 freely rotates.

A rotation of the differential case 646 further causes the first and second axle shafts 16, 18 to rotate therewith. The rotation of the differential mechanism 648 transfers a desired first torque from the differential mechanism 648 to the first and second axle shafts 16, 18.

A rotation of the second axle shaft 18 causes a rotation of the third gear 672 of the fourth planetary gear assembly 670 coupled thereto, to rotate therewith. Torque is transferred from the axle shaft 18 to the third gear 672. A rotation of the third gear 672 drives the planet gears 674 and the planet carrier 678 coupled thereto. As such, the torque from the third gear 672 is then transferred to the planet carrier 678 via the planet gears 674. A rotation of the planet carrier 678 causes the fourth planetary gear assembly 670, and the fourth axle shaft 679 coupled thereto, to rotate therewith. The torque from the planet carrier 678 is then transferred through the fourth axle shaft 679 to the wheel 8, shown in FIG. 1.

In certain embodiments, the second speed ratio may also be referred to as a highway ratio. The second speed ratio enables the electric drive axle assembly 600 to operate at low torque and high speed.

Figure 8:
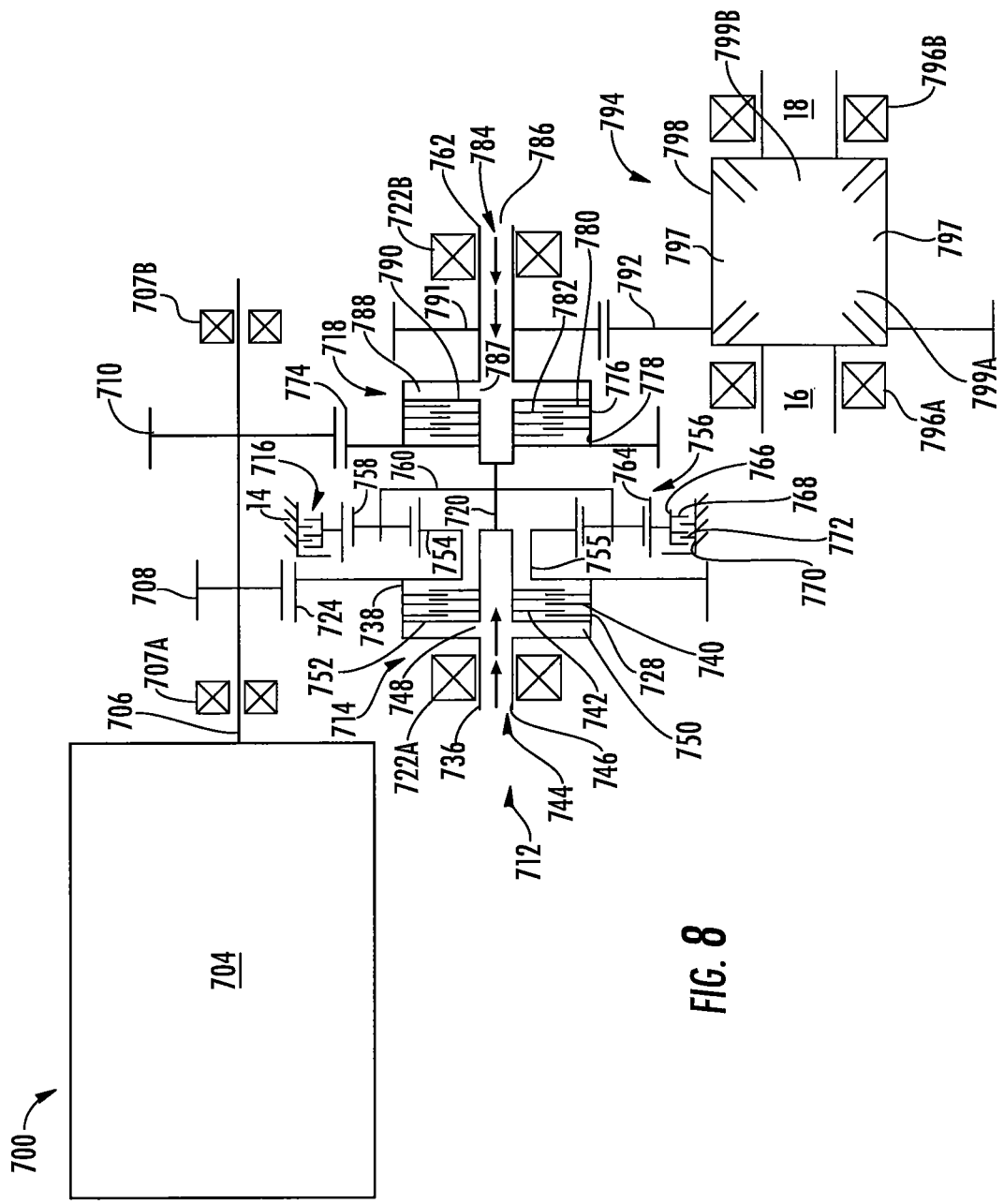
FIG. 8 is a schematic diagram of an electric axle assembly according to another embodiment of the presently disclosed subject matter.

Referring now to an embodiment shown in FIG. 8, the electric drive axle assembly 700 comprises an output shaft 706, axle shafts 16, 18, and a compound idler assembly 712 disposed offset and parallel to the motor output shaft relative to each other. In an embodiment, the electric drive axle 700 comprises the output shaft 706 coupled with the rotor of the electric motor 704 for rotation therewith. The output shaft 706 is rotatably supported within a stationary structure such as the axle housing 14, for example, by first and second bearings 707A, 707B. It is understood that the bearings 707A, 707B can be any type of bearing as desired such as a roller bearing, a ball bearing, a tapered bearing, and the like, for example. A first gear 708 may be coupled with the output shaft 706 and fixed for rotation therewith. In an embodiment, the first gear 708 is forged on the output shaft 706. In another embodiment, the first gear 708 may be welded to the output shaft 706. In still another embodiment, the first gear 708 may be splined to the output shaft 706.

In certain embodiments, the first gear 708 is concentrically disposed about the output shaft 706 axially adjacent the bearing 707A. A second gear 710 is also coupled to the output shaft 706. In certain embodiments, the second gear 710 is concentrically disposed about the output shaft 706 axially adjacent the first gear 708.

In certain embodiments, as described in further detail hereinafter, the electric motor 704 drives the compound idler assembly 712 via the first gear 708 when one of a first clutch assembly 714 and a second clutch assembly 716 is engaged, or via the second gear 710 when a third clutch assembly 718 is engaged. As illustrated in FIG. 8, the compound idler assembly 712 is disposed parallel with the output shaft 706 of the electric motor 704. The compound idler assembly 712 comprises an idler shaft 720 rotatably supported in the stationary structure (e.g. the axle housing 14) via third and fourth bearings 722A, 722B. It is understood that each of the bearings 722A, 722B can be any type of bearing as desired such as a roller bearing, a ball bearing, a tapered bearing, and the like, for example. A pair of positioning elements (not depicted) may be respectively disposed on ends of the idler shaft 720 to maintain a position of the bearings 722A, 722B. It is understood that each of the positioning elements can be any type of positioning element as desired such as a snap ring, for example but could use a shim and press fit bearings if the application allows for it.

A third gear 724 is concentrically disposed about the idler shaft 720 axially adjacent to the third bearing 722A. The third gear 724 may rotate relative to the idler shaft 720 via at least one bearing (not depicted) disposed radially therebetween. It is understood that the at least one bearing can be any type of bearing as desired such as a needle bearing, a roller bearing, a ball bearing, a tapered bearing, and the like, for example. The third gear 724 is in meshed engagement with the first gear 724 and receives torque therefrom when the first clutch assembly 714 is engaged and the electric motor 704 drives the electric drive axle assembly 700.

As illustrated, the first clutch assembly 714 is concentrically disposed about the idler shaft 720. The third gear 724 is coupled with a first clutch drum 728 of the first clutch assembly 714. In an embodiment, the first clutch drum 728 and the third gear 724 may be coupled via splined engagement. In another embodiment, the first clutch drum 728 and the third gear 724 may be coupled via an interference fit. In yet another embodiment, the third gear 724 and the first clutch drum 728 may comprise a unitary component. The first clutch drum 728 is rotatably supported on the idler shaft 720. Further, rotary sealing members (not depicted) may be disposed adjacent to the first clutch assembly 714 to create a substantially fluid-tight seal between a portion of the first clutch drum 728 and a first portion 736 of the idler shaft 720. The third gear 724 may be entirely supported on the first portion 736 by the first clutch drum 728.

A first clutch hub 738 is disposed at least partially concentrically within the first clutch drum 728. In an embodiment, the first clutch hub 738 may be coupled for rotation with the first portion 736 of the idler shaft 720. In an embodiment, the first clutch hub 738 may comprise a splined radially inner surface in meshed engagement with complimentary splines on the first portion 736 of the idler shaft 720. In another embodiment, the first clutch hub 738 may be formed unitary and integral with the first portion 736 of the idler shaft 720.

A first plurality of clutch plates 740 are coupled for rotation with the first clutch drum 728. The clutch plates 740 receive torque from the first clutch drum 728 and may move axially within the first clutch drum 728. A second plurality of clutch plates 742 are in meshed engagement with the first portion 736 of the idler shaft 720. The second plurality of clutch plates 742 are interleaved with the first plurality of clutch plates 740. The second plurality of clutch plates 742 may move axially on the first portion 736 of the idler shaft 720. The first clutch assembly 714 may be nested entirely within the third gear 724.

A first actuator assembly 744 may be utilized to selectively actuate the first clutch assembly 714. In an embodiment, as illustrated in FIG. 8, the first actuator assembly 744 may comprise a hydraulic actuator. In an embodiment, the first actuator assembly 744 comprises the first portion 736 of the idler shaft 720. In an embodiment, the first portion 736 may have a generally cylindrical shape defining a fluid conduit 746. The first portion 736 may also comprise one more radially extending apertures 748 in fluid communication with both the fluid conduit 746 and a chamber 750. The chamber 750 may be defined by the first portion 736, a portion of the first clutch drum 728, the rotary sealing members, and a pressure plate 752. The first actuator assembly 744 may also comprise a fluid reservoir (not depicted) in fluid communication with the fluid conduit 746. The fluid conduit 746 is in fluid communication with the chamber 750 via the one or more apertures 748. When the fluid pressure in the chamber 750 is increased via a pump (not depicted), the pressure plate 752 is axially actuated to frictionally engage the first and second pluralities of clutch plates 740, 742 of the first clutch assembly 714. Accordingly, the electric motor 704 drives the third gear 724 when the first clutch assembly 714 is engaged. It should be appreciated that any type of the first clutch assembly 714 can be employed as desired such as a wet clutch assembly, a simple dog clutch assembly, a dog clutch assembly with a synchronizer, and the like, for example.

In certain embodiments, the third gear 724 is coupled to a fourth gear 754. As shown in FIG. 8, the third gear 724 and the fourth gear 754 may be coupled to a common shaft 755 concentrically disposed about the idler shaft 720. The fourth gear 754 may be a sun gear of a planetary gear assembly 756. The planetary gear assembly 756 may further comprise two or more planet gears 758 in meshed engagement with the fourth gear 754. The planet gears 758 may be rotatably disposed on planet pins (not depicted) coupled with a planet carrier 760. The planet carrier 760 may be coupled with a second portion 762 of the idler shaft 720 and fixed for rotation therewith. The planet gears 758 may also be in meshed engagement with a ring gear 764 disposed at least partially concentrically about the planet gears 758 and the fourth gear 754. The ring gear 764 may be selectively engaged with a stationary structure such as the axle housing 14, for example, via a second clutch assembly 716.

The second clutch assembly 716 may comprise a second clutch hub 766 coupled with the ring gear 764. The second clutch hub 766 may include a plurality of axially extending splines on a radially outer surface thereof. A first plurality of clutch plates 768 are in meshed engagement with the second clutch hub 766. The first plurality of clutch plates 768 may move axially along the second clutch hub 766. The stationary structure may comprise a second clutch drum 770 having a plurality of axially extending splines on a radially inner surface thereof. A second plurality of clutch plates 772 are in meshed engagement with the stationary structure such as the axle housing 14, for example. The second plurality of clutch plates 772 are interleaved with the first plurality of clutch plates 768. The second plurality of clutch plates 772 may move axially on the stationary structure. A second actuator assembly (not depicted) may be utilized to selectively actuate the second clutch assembly 716. Various types of actuators may be employed as the second actuator assembly such as a hydraulic actuator, for example.

A fifth gear 774 is coupled to the second portion 762 of the idler shaft 720 for rotation therewith. The fifth gear 774 is in meshed engagement with the second gear 710 and receives torque therefrom when the third clutch assembly 718 is engaged and the electric motor 704 drives the electric drive axle assembly 700.

As illustrated, the third clutch assembly 718 is concentrically disposed about the idler shaft 720. The fifth gear 774 is coupled with a third clutch drum 776 of the third clutch assembly 718. In an embodiment, the third clutch drum 776 and the fifth gear 774 may be coupled via splined engagement. In another embodiment, the third clutch drum 776 and the fifth gear 774 may be coupled via an interference fit. In yet another embodiment, the fifth gear 774 and the third clutch drum 776 may comprise a unitary component. The first clutch drum 776 is rotatably supported on the idler shaft 720. Further, rotary sealing members (not depicted) may be disposed adjacent to the third clutch assembly 718 to create a substantially fluid-tight seal between a portion of the third clutch drum 776 and the second portion 762 of the idler shaft 720. The fifth gear 774 may be entirely supported on the second portion 762 by the third clutch drum 776.

A third clutch hub 778 is disposed at least partially concentrically within the third clutch drum 776. In an embodiment, the third clutch hub 778 may be coupled for rotation with the second portion 762 of the idler shaft 720. In an embodiment, the third clutch hub 778 may comprise a splined radially inner surface in meshed engagement with complimentary splines on the second portion 762 of the idler shaft 720. In another embodiment, the third clutch hub 778 may be formed unitary and integral with the second portion 762 of the idler shaft 720.

A first plurality of clutch plates 780 are coupled for rotation with the third clutch drum 776. The clutch plates 780 receive torque from the third clutch drum 776 and may move axially within the third clutch drum 776. A second plurality of clutch plates 782 are in meshed engagement with the second portion 762 of the idler shaft 720. The second plurality of clutch plates 782 are interleaved with the first plurality of clutch plates 780. The second plurality of clutch plates 782 may move axially on the second portion 762 of the idler shaft 720. The third clutch assembly 718 may be nested entirely within the fifth gear 774.

A third actuator assembly 784 may be utilized to selectively actuate the third clutch assembly 718. In an embodiment, as illustrated in FIG. 8, the third actuator assembly 784 may comprise a hydraulic actuator. In an embodiment, the third actuator assembly 784 comprises the second portion 762 of the idler shaft 720. In an embodiment, the second portion 762 may have a generally cylindrical shape defining a fluid conduit 786. The second portion 786 may also comprise one more radially extending apertures 787 in fluid communication with both the fluid conduit 786 and a chamber 788. The chamber 788 may be defined by the second portion 762, a portion of the third clutch drum 776, the rotary sealing members, and a pressure plate 790. The third actuator assembly 784 may also comprise a fluid reservoir (not depicted) in fluid communication with the fluid conduit 786. The fluid conduit 786 is in fluid communication with the chamber 788 via the one or more apertures 787. When the fluid pressure in the chamber 788 is increased via a pump (not depicted), the pressure plate 790 is axially actuated to frictionally engage the first and second pluralities of clutch plates 780, 782 of the third clutch assembly 718. Accordingly, the electric motor 704 drives the fifth gear 774 via the second gear 710 when the third clutch assembly 718 is engaged. It should be appreciated that any type of the third clutch assembly 718 can be employed as desired such as a wet clutch assembly, a simple dog clutch assembly, a dog clutch assembly with a synchronizer, and the like, for example.

A sixth gear 791 is coupled for rotation with the idler shaft 720. The sixth gear 791 shown is disposed axially adjacent to the fourth bearing 722B. The sixth gear 791 from the first gear 708 when one of the clutch assemblies 714, 716 is engaged, and from the second gear 710 when the third clutch assembly 718 is engaged and the electric motor 704 drives the electric drive axle assembly 700. As illustrated, the sixth gear 791 is in meshed engagement with a seventh gear 792. The sixth gear 791 drives the seventh gear 792 when one of the first, second, and third clutch assemblies 714, 716, 718 is engaged and the electric motor 704 drives the electric drive axle assembly 700. The seventh gear 792 is coupled for rotation with a differential mechanism 794. The differential mechanism 794 is rotatably supported within the axle housing 14 via a pair of bearings 796A, 796B. It is understood that each of the bearings 796A, 796B can be any type of bearing as desired such as a roller bearing, a ball bearing, a tapered bearing, and the like, for example.

As illustrated in FIG. 8, the differential mechanism 794 includes two or more differential pinions 797 disposed within a differential case 798. The differential pinions 797 are coupled with the differential case 798 via a pinion shaft (not depicted). In an embodiment, the pinion shaft may comprise a cross member. The differential pinions 797 are in meshed engagement with first and second side gears 799A, 799B. The first and second side gears 799A, 799B are coupled for rotation with the first and second half shafts 16, 18, respectively, shown in FIG. 1.

In operation, when a first speed ratio is desired, the first actuator assembly 744 causes the first clutch assembly 714 to engage, while the second clutch assembly 716 and the third clutch assembly 718 remain disengaged. When the first clutch assembly 714 is engaged, the output shaft 706 of the electric motor 704 causes the output shaft 706 and the first gear 708 and the second gear 710 coupled thereto, to rotate therewith. Torque is transferred from the electric motor 704 to the first gear 708. A rotation of the first gear 708 drives the third gear 724, and thereby the sixth gear 791 of the compound idler assembly 712. Hence, the torque is then transferred from the first gear 708 to the sixth gear 791 via the third gear 724. Since the first clutch assembly 714 is engaged, the rotation of the third gear 724 causes the idler shaft 720 and the sixth gear 791 coupled thereto, to rotate therewith. The torque from the third gear 724 is then transferred to the idler shaft 720 via the first clutch assembly 714, and from the idler shaft 720 to the sixth gear 791. The torque transferred from the third gear 724 to the sixth gear 791 remains unchanged because the planetary gear assembly 756 and the fifth gear 774 freely rotate due to the second and third clutch assemblies 716, 718, respectively, being disengaged.

A rotation of the sixth gear 791 drives the seventh gear 792 of the differential mechanism 794, and causes the differential case 798 to rotate therewith. As such, the torque from the third gear 724 is transferred through the sixth gear 791 to the differential mechanism 794. A rotation of the differential case 798 further causes the first and second axle shafts 16, 18 to rotate therewith. The rotation of the differential mechanism 798 transfers a desired first torque from the differential mechanism 798 to the first and second axle shafts 16, 18. When the electric drive axle 700 is in a power generation mode, the torque transfer described above is reversed.

In certain embodiments, the first speed ratio may also be referred to as a city ratio. The first speed ratio enables the electric drive axle assembly 700 to operate at medium torque and medium speed.

When a second speed ratio is desired, the second actuator assembly causes the second clutch assembly 716 to engage, while the first clutch assembly 714 and the third clutch assembly 718 remain disengaged. When the second clutch assembly 716 is engaged, the output shaft 706 of the electric motor 704 causes the output shaft 706 and the first gear 708 and the second gear 710 coupled thereto, to rotate therewith. Torque is transferred from the electric motor 704 to the first gear 708. A rotation of the first gear 708 drives the fourth gear 754 of the planetary gear assembly 756, and thereby the sixth gear 791 of the compound idler assembly 712. Hence, the torque is then transferred from the first gear 708 to the sixth gear 791 via the planetary gear assembly 756. Since the first clutch assembly 714 is disengaged and the second clutch assembly 716 is engaged, the rotation of the third gear 724 causes the common shaft 755 and the fourth gear 754 coupled thereto, to rotate therewith. The torque from the third gear 724 is then transferred through the idler shaft 720 to the fourth gear 754 via the second clutch assembly 714.

A rotation of the fourth gear 754 drives the planet gears 758 and the planet carrier 760 coupled thereto. As such, the torque from the fourth gear 754 is then transferred to the planet carrier 760 via the planet gears 758. A rotation of the planet carrier 414 causes the idler shaft 720 and the sixth gear 791 coupled thereto, to rotate therewith. The torque from the planet carrier 760 is then transferred to the idler shaft 720 via the second clutch assembly 716 to the sixth gear 791. The torque transferred from the first gear 408 through the second and third gears 724, 754 to the sixth gear 791 is increased because of the planetary gear assembly 756.

A rotation of the sixth gear 791 drives the seventh gear 792 of the differential mechanism 794, and causes the differential case 798 to rotate therewith. As such, the torque from the third gear 724 is transferred through the sixth gear 791 to the differential mechanism 794. A rotation of the differential case 798 further causes the first and second axle shafts 16, 18 to rotate therewith. The rotation of the differential mechanism 798 transfers a desired first torque from the differential mechanism 798 to the first and second axle shafts 16, 18. When the electric drive axle 700 is in a power generation mode, the torque transfer described above is reversed.

In certain embodiments, the second speed ratio may also be referred to as a crawl ratio. The second speed ratio enables the electric drive axle assembly 700 to operate at high torque and low speed.

When a third speed ratio is desired, the third actuator assembly 784 causes the third clutch assembly 718 to engage, while the first clutch assembly 714 and the second clutch assembly 716 remain disengaged. When the third clutch assembly 718 is engaged, the output shaft 706 of the electric motor 704 causes the output shaft 706 and the first gear 708 and the second gear 710 coupled thereto, to rotate therewith. Torque is transferred from the electric motor 704 to the second gear 710. A rotation of the second gear 710 drives the fifth gear 774, and thereby the sixth gear 791 of the compound idler assembly 712. Hence, the torque is then transferred from the second gear 708 to the sixth gear 791 via the fifth gear 774. Since the third clutch assembly 718 is engaged, the rotation of the fifth gear 774 causes the idler shaft 720 and the sixth gear 791 coupled thereto, to rotate therewith. The torque from the fifth gear 774 is then transferred to the idler shaft 720 via the third clutch assembly 718, and from the idler shaft 720 to the sixth gear 791. The torque transferred from the fifth gear 774 to the sixth gear 791 remains unchanged because third gear 724 and the planetary gear assembly 756 freely rotate due to the first and second clutch assemblies 714, 716, respectively, being disengaged.

A rotation of the sixth gear 791 drives the seventh gear 792 of the differential mechanism 794, and causes the differential case 798 to rotate therewith. As such, the torque from the third gear 724 is transferred through the sixth gear 791 to the differential mechanism 794. A rotation of the differential case 798 further causes the first and second axle shafts 16, 18 to rotate therewith. The rotation of the differential mechanism 798 transfers a desired first torque from the differential mechanism 798 to the first and second axle shafts 16, 18. When the electric drive axle 700 is in a power generation mode, the torque transfer described above is reversed.

In certain embodiments, the third speed ratio may also be referred to as a highway ratio. The third speed ratio enables the electric drive axle assembly 700 to operate at low torque and high speed.

Accordingly, the compound idler assembly 712 enables the electric drive axle assembly 700 to achieve a drive ratio span facilitating urban, rural, and highway driving as well as towing and rock crawling.

One or more features of the embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
   an electric motor having an output shaft;
   at least one of a gear and a first planetary gear assembly connected to the output shaft;
   a differential mechanism connected with the at least one of the gear and the first planetary gear assembly, wherein the differential mechanism is connected to at least one axle shaft;
   a first clutch assembly connected with at least one of the output shaft and the differential mechanism, wherein an engagement of the first clutch assembly produces a first speed ratio;
   a second clutch assembly connected with at least one of the output shaft and the differential mechanism, wherein an engagement of the second clutch assembly produces a second speed ratio; and
   a compound idler assembly connected to at least one of the output shaft and the differential mechanism.

2. The axle assembly of claim 1, further comprising a third clutch assembly connected with at least one of the output shaft and the differential mechanism, wherein an engagement of the third clutch assembly produces a third speed ratio.

3. The axle assembly of claim 1, wherein the compound idler assembly is disposed offset and parallel to the output shaft of the electric motor.

4. The axle assembly of claim 1, wherein at least one of the first planetary gear assembly, the first clutch assembly, and the second clutch assembly is disposed on the compound idler assembly.

5. The axle assembly of claim 2, wherein one of the first clutch assembly, the second clutch assembly, and the third clutch assembly is connected to the first planetary gear assembly.

6. The axle assembly of claim 1, wherein the first planetary gear assembly is selectively connected to the output shaft by one of the first clutch assembly and the second clutch assembly.

7. The axle assembly of claim 1, wherein the at least one axle shaft is coaxially aligned with the output shaft.

8. The axle assembly of claim 1, further comprising a second planetary gear assembly connected to the output shaft.

9. The axle assembly of claim 8, wherein the second planetary gear assembly is selectively connected to the output shaft by one of the first clutch assembly and the second clutch assembly.

10. The axle assembly of claim 8, wherein the second planetary gear assembly is connected to the first planetary gear assembly.

11. The axle assembly of claim 8, further comprising a third planetary gear assembly connected to the at least one axle shaft.

12. The axle assembly of claim 11, further comprising a fourth planetary gear assembly connected to the at least one axle shaft.

13. A method, comprising:
providing an axle assembly including:
an electric motor having an output shaft;
at least one of a gear and a first planetary gear assembly coupled to the output shaft;
a differential mechanism connected with the at least one of the gear and the first planetary gear assembly, wherein the differential mechanism is connected to at least one axle shaft;
a first clutch assembly connected with at least one of the output shaft and the differential mechanism, wherein an engagement of the first clutch assembly produces a first speed ratio;
a second clutch assembly connected with at least one of the output shaft and the differential mechanism, wherein an engagement of the second clutch assembly produces a second speed ratio; and
a third clutch assembly connected with at least one of the output shaft and the differential mechanism, wherein an engagement of the third clutch assembly produces a third speed ratio; and
causing the engagement of one of the first clutch assembly and the second clutch assembly.

14. The method of claim 13, further comprising causing the engagement of the third clutch assembly.

15. An axle assembly, comprising:
an electric motor having an output shaft;
a first gear in a planetary gear assembly rotationally connected to the output shaft;
a differential mechanism rotationally connected with at least one of the first gear and the first planetary gear assembly, wherein the differential mechanism is rotationally connected to an axle shaft;
a first clutch assembly including:
a first plurality of clutch plates rotationally connected to the output shaft; and
a second plurality of clutch plates rotationally connected to the differential mechanism, wherein an engagement of the first clutch assembly produces a first speed ratio; and
a second clutch assembly rotationally connected to the differential mechanism, wherein an engagement of the second clutch assembly produces a second speed ratio.

16. The axle assembly of claim 15, further comprising an idler shaft rotationally connected to at least one of the output shaft and the differential mechanism.

17. The axle assembly of claim 16, wherein the output shaft, the idler shaft, and the axle shaft are offset from one another.

18. The axle assembly of claim 15, wherein the second clutch assembly includes a plurality of plates connected to a second gear in the planetary gear assembly.

19. The axle assembly of claim 18, wherein the second gear is a ring gear.

* * * * *